United States Patent
Lettowsky

(10) Patent No.: US 10,773,450 B2
(45) Date of Patent: Sep. 15, 2020

(54) METHOD FOR MANUFACTURING A BLOWN FILM WEB AS WELL AS A BLOWN FILM LINE

(71) Applicant: REIFENHÄUSER GMBH & CO. KG MASCHINENFABRIK, Troisdorf (DE)

(72) Inventor: Christoph Lettowsky, Aachen (DE)

(73) Assignee: REIFENHÄUSER GMBH & CO. KG MASCHINENFABRIK (DE)

( * ) Notice: Subject to any disclaimer, the term of this patent is extended or adjusted under 35 U.S.C. 154(b) by 668 days.

(21) Appl. No.: 15/029,558

(22) PCT Filed: Oct. 15, 2014

(86) PCT No.: PCT/DE2014/000522
§ 371 (c)(1),
(2) Date: Apr. 14, 2016

(87) PCT Pub. No.: WO2015/055170
PCT Pub. Date: Apr. 23, 2015

(65) Prior Publication Data
US 2016/0263813 A1   Sep. 15, 2016

(30) Foreign Application Priority Data
Oct. 15, 2013 (DE) .................. 10 2013 017 116

(51) Int. Cl.
*B29C 55/28* (2006.01)
*B29C 48/10* (2019.01)
(Continued)

(52) U.S. Cl.
CPC .............. *B29C 55/28* (2013.01); *B29C 48/10* (2019.02); *B29C 48/908* (2019.02);
(Continued)

(58) Field of Classification Search
CPC ......... B29C 55/06; B29C 55/28; B29C 48/10; B29C 48/913; B29C 48/92;
(Continued)

(56) References Cited

U.S. PATENT DOCUMENTS 2,976,567 A   3/1961   James et al.
3,116,787 A   1/1964   Campbell
(Continued)

FOREIGN PATENT DOCUMENTS

AT   267160 A   12/1968
AT   342292 A   3/1978
(Continued)

OTHER PUBLICATIONS

CN Office Action dated Feb. 11, 2018 re: Application No. CN 201480056690.0; pp. 1-15 citing: US 20110006452.
(Continued)

*Primary Examiner* — Joseph S Del Sole
*Assistant Examiner* — Mohamed K Ahmed Ali
(74) *Attorney, Agent, or Firm* — Tarolli, Sundheim, Covell & Tummino LLP

(57) ABSTRACT

In a method for manufacturing blown film web on a blown film line, film is heated above the takeoff device and then treated mechanically. This allows the film to be brought from initial heat to an easy-to-process temperature level with little energy. A horizontally oriented treatment roll path is provided between the takeoff and a reversing device is arranged above the takeoff. In both aspects, controlling is performed to achieve a uniform film gauge after stretching.

10 Claims, 12 Drawing Sheets

(51) Int. Cl.
  *B29L 23/00* (2006.01)
  *B29C 48/88* (2019.01)
  *B29C 48/90* (2019.01)
(52) U.S. Cl.
  CPC .......... *B29C 48/913* (2019.02); *B29C 48/914* (2019.02); *B29C 48/9135* (2019.02); *B29L 2023/001* (2013.01)
(58) Field of Classification Search
  CPC ...... B29C 48/0018; B29C 2948/92523; B29C 2948/92647; B29C 2948/92619; B29C 48/0019; B29L 2023/001
  See application file for complete search history.

(56) References Cited

U.S. PATENT DOCUMENTS

| | | | |
|---|---|---|---|
| 3,340,565 A | 9/1967 | Holly | |
| 3,768,949 A | 10/1973 | Upmeier | |
| 4,086,045 A | 4/1978 | Thiel et al. | |
| 4,634,358 A * | 1/1987 | Dellbrugge | B29C 53/10 264/209.2 |
| 4,676,728 A | 6/1987 | Planeta | |
| 4,978,484 A * | 12/1990 | Takashige | B29C 55/28 264/40.1 |
| 5,458,841 A | 10/1995 | Shirrell | |
| 6,413,346 B1 | 7/2002 | Planeta et al. | |
| 6,447,278 B1 | 9/2002 | Arruda | |
| 7,396,498 B1 | 7/2008 | Johnstone | |
| 2010/0207292 A1* | 8/2010 | Noritsune | B29C 48/04 264/211.11 |
| 2011/0000645 A1 | 1/2011 | Chen et al. | |
| 2011/0006452 A1 | 1/2011 | Bayer et al. | |
| 2011/0161036 A1 | 6/2011 | Keller et al. | |
| 2011/0210471 A1 | 9/2011 | Rasmussen et al. | |
| 2012/0299209 A1 | 11/2012 | Trommelen et al. | |

FOREIGN PATENT DOCUMENTS

| | | |
|---|---|---|
| CH | 432815 A | 3/1967 |
| CH | 475082 A | 7/1969 |
| CN | 87108289 A | 7/1988 |
| DE | 1504461 A | 4/1969 |
| DE | 2132259 A1 | 1/1973 |
| DE | 3508626 C1 | 2/1986 |
| DE | 3941185 A1 | 6/1991 |
| DE | 69208002 T2 | 6/1996 |
| DE | 10047836 A1 | 4/2002 |
| DE | 10242174 A1 | 3/2004 |
| DE | 102009033171 A1 | 1/2011 |
| DE | 102009046592 A1 | 5/2011 |
| EP | 0673750 A1 | 9/1995 |
| EP | 1147877 A2 | 10/2001 |
| EP | 1780500 A1 | 5/2007 |
| EP | 2277681 A1 | 1/2011 |
| EP | 2514580 A2 | 10/2012 |
| GB | 2201371 A | 9/1988 |
| WO | 2005102666 A1 | 11/2005 |
| WO | 2014023282 A1 | 2/2014 |

OTHER PUBLICATIONS

International Search Report dated Feb. 17, 2015 re: Application No. PCT/DE2014/000522; pp. 1-2; citing: EP 2 277 681 A1, EP 1 780 500 A1 and EP 2 514 580 A2.
Brazilian Preliminary Office Action for BR112016008316-4 dated Mar. 5, 2020.

* cited by examiner

METHOD FOR MANUFACTURING A BLOWN FILM WEB AS WELL AS A BLOWN FILM LINE

CROSS-REFERENCE TO RELATED APPLICATIONS

This application is related to and claims the benefit of German Patent Application No. DE 10 2013 017 116.4, filed on Oct. 15, 2013, and PCT Application No. PCT/DE2014/000522, filed on Oct. 15, 2014, the contents of which are herein incorporated by reference in their entirety.

TECHNICAL FIELD

The disclosure relates to a method for manufacturing a blown film web as well as a blown film line.

BACKGROUND

Blown film lines are known. The lines are fed plastics in granulated form, which are then plasticized into a viscous mass under high pressure in extruders. This mass is formed into an annular shape in a die head and exits the die head through an annular nozzle. The mass already forms a film tube from the time of leaving the annular nozzle. The film tube is taken off towards the top along a tube-forming zone, in which compressed air is injected into the interior of the film tube. This results in transverse stretching of the film tube. At a tolerable distance from the annular nozzle, cooling the melt is achieved by using an active means of cooling for the rising film tube. On its path to the top, the film tube—in a mostly semi-crystalline state—passes through a calibration cage and then a collapsing frame, which flattens the tube. The collapsing frame unit feeds the double-layer film web to a pre-nip system. The pre-nip system usually includes a pair of rolls through the gap of which—the nip—the film runs. The pre-nip system is followed by a nip system, in which the film tube is finally turned into a practically air-free double-layer film web. From this point in the process on at the latest, or rather, already from the pre-nip process on, there is a double-layer film web. The distance from the pre-nip system to the nip system has been sized such that the film can dissipate the heat from the extrusion process during the transport between the two roll pairs. Thus, in this way, the film tube is cooled additionally so that it can then be processed further. This includes, e.g., the slitting of the film tube, resulting in two separate film webs.

Many lines work without a pre-nip system; instead, they route the film directly from the collapsing frame to the nip system. In such a line design, the rising film is also already cooled off so much at the nip roll pair that strong intervention at the surface will not do any, or little, damage to the film. For the nip system normally draws the film up at a significantly higher speed than the speed with which the film is extruded at the annular nozzle. An exemplary speed ratio is from about 10:1 up to 20:1. The blown film is immediately inflated with compressed air from the inside as the tube forms above the annular nozzle, and thus stretched transversely. At the same time, the nip roll pair draws the film off upwards at high speed so that longitudinal stretching occurs below the frost line.

Thus, in total, the film tube is stretched biaxially below the frost line. Depending on the application the film end product will be used in, the share of longitudinal stretching or that of lateral stretching can prevail.

However, a blown film line will always have to grapple with the technical disadvantage that the visual film quality cannot keep up with the film quality of cast films. This results from the fact that the rising film tube shape cools off relatively slowly. The longer the cooling process of the plastic melt takes, the more opaque and less glossy the film surface will get.

However, in order to be able to exert a sufficient force onto the rising film with the nip roll pair, the film must have cooled off relatively strongly. Given the slow cooling-off speed of the extruded film, this results in great built height for blown film lines. Thus, as fast as possible above the nip system, the double-layer film web is deflected horizontally, routed next to the line and downward from there for the further treatment steps. Usually, a winder is placed next to the system on the floor of its erection location, which winder winds the double-layer film web onto a roll for further transport.

Upstream from the winder, stretching systems are sometimes provided, whereby the term "stretching" is understood as a generic term for "strong stretching in machine direction, MDO" and "extending in machine direction" in the context of the present patent application.

An "MDO stretching" system stretches the film by more than 5%, at any rate, in the longitudinal/machine direction, preferably by 50% and more, often also by up to 1,000%. Such systems are often called "MDO", which stands for "machine direction orientation"; i.e., for orienting the plastic molecules in the direction of the machine; i.e., the material's transport direction through the line.

As an alternative to an MDO, a so-called layflat package can be provided as a stretching system upstream from the winder. This package irreversibly "stretches" the film, usually by between 0.5% and 5% in the direction of the machine, which merely serves to even out differences in running lengths over the width of the double-layer film web and in the directional stability of the film web, allowing the film to be more easily wound up and processed further.

Both stretching systems—i.e., an MDO and a layflat package—are easily technologically comparable insofar as they stretch the film longitudinally. For this purpose, after an initial slower roll, or, e.g., after additional passive rolls, a roll that is driven faster follows immediately. The speed differential between the two rolls, which can also be embodied as nip roll pairs, which each transport the film by means of adhesive friction, results in a change of the film's length.

The distance between the two areas in which the film is transported at the circumferential speed of each roll is called the "stretching section", or as "stretched length", when projected onto the machine direction.

In a roughly central section of the film web's enveloping of a roll, the film web is transported by means of adhesive friction, i.e., at the circumferential speed of the roll. Static friction ends even before the film web leaves the roll surface at a lift-off point. This is of significance particularly when the subsequent roll runs at a higher circumferential speed; i.e., the film web transitions already on the roll surface from adhesive friction to the faster dynamic friction and only then lifts off from the roll surface.

The same principle can also be found in the winding process onto a roll: The film web already makes contact with the revolving roll surface from a contact point; adhesive friction, however, does not begin until beyond the contact point.

For simplicity's sake, the term "points" is used here. A film web lifts off a roll at a lift-off line and lands on a roll surface with a contact line. In a side view, the two-dimensional film web has, however, been reduced to a line by one dimension; accordingly, the lift-off and the contact line are each reduced to points by one dimension.

It should be noted that instead of a roll, as a rule, a nip roll pair can also be used just as well for transporting the film. For simplicity's sake, the present application usually speaks only of a roll, but it thereby also means a nip roll pair as a replacement means known in the art.

A nip roll pair can tend to effect more secure gripping of the film because the film surface is gripped from both sides. However, a roll impinging laterally can also exert a sufficient longitudinal force on the film, which, e.g., depends on the surface design of the roll in concert with the respective film to be processed and, e.g., from the roll's arc of contact. Usually, for a single driven roll, a contact roll will be provided at any rate in order to ensure more reliably that the film can actually be gripped securely by the driven roll, excluding any slippage.

The blown film method is suitable for the manufacture of stretch plastic films. These films are stretched monoaxially in the direction of the machine in MD stretching systems, which results in films with reduced film gauges. MD stretching improves, e.g., the following film properties: Tear strength, rigidity, transparency, barrier properties, and/or machinability. The films are used, e.g., in flexible packaging.

In the manufacture of tube films, film gauge profile control systems with segmented control zones are used. These systems allow controlling the film gauge profile in such a manner that the thickness variances over the entire tube circumference are minimized. DE 100 47 836 A1 describes such a method for controlling the film gauge profile in blown film lines, specifically based on measuring one or several individual layer thickness(es) of a multi-layer film as a reference parameter.

Systems for controlling film gauges in longitudinal/MD stretching systems for cast films or laminated films are also known. Control is significantly easier as the film will not be reversed and thus, the direct assignment of the individual measuring points in the gauge profile diameter of the longitudinally stretched film to the extrusion nozzle including actuators, or respectively, to the control zones is possible.

From DE 39 41 185 A1, a method for controlling the film gauge of tube films from blown film lines with downstream axial or biaxial stretching of the inflated tube films in an oven is known, resulting in a final film with minimized gauge variances.

In the longitudinal stretching process of an MD system, the film is stretched in the direction of the machine according to the MD stretch degree, thus reducing the film gauge. At the same time, the film shrinks in the lateral direction, reducing the film's width. This shrinkage results in the stretched film becoming slightly thicker from the center of the film towards the film edges, despite the fact that it was controlled to have the most constant gauge possible during the preceding blowing process. This increase in film gauge is especially pronounced in the film edge areas. During the subsequent winding of the film, this causes thicker edges in the film rolls. With increasing roll diameters, the film web edges will increasingly be stretched, resulting in severe disadvantages for subsequent processing such as printing or laminating.

Shrinkage and thus, thicker edges on the film roll, can be reduced by measures such as a minimized stretching gap, suitable roll coating, mechanical or electro-static holding of film edges, optimized temperature management, or suitable selection of plastic materials. However, this is not sufficient for many subsequent processing steps. Only if the film edges are trimmed will the remaining film web have a sufficiently small variance from the gauge profile that is required for the subsequent winding of the film web and its further processing. But much of the film width is lost by trimming. Regardless of film width, about 200 mm are trimmed on either side of the film.

In WO 2014/023282 A1, published later by the same Applicant as the present one, it is proposed that the film be heated above the nip and then treated mechanically. Thus, the film can be brought to an easily processable temperature level from the initial heat, using little energy. According to a second aspect, it is proposed that a tensile force bottom-out brake be provided.

EP 2 277 681 A1, which is part of the prior art, discloses a control method for achieving a film having the most even gauge possible at the winder.

EP 1 147 877 A2 discloses in its second embodiment in FIG. 5 a manufacturing line for stretch film whereby, however, the initial heat is no longer present in the stretching section between the stretch roll pairs because there, the double-layer film web is routed around the take-off roll pair to the side and is not stretched until significantly later. In particular, there is little or no rising initial heat from the blown film process.

The same applies to U.S. Pat. No. 6,413,346 B.

U.S. Pat. No. 2,976,567 shows a cast film line, not a blown film line. Thus, there is no take-off roll pair; besides there is precisely no effect of great heat collecting above the die head, and thus, above the nip roll pair.

In U.S. Pat. No. 7,396,498 B1, optional stretching of the double-layer film web is performed at the very bottom directly next to the die head; i.e., practically on the factory floor.

U.S. Pat. No. 5,458,841 performs longitudinal stretching between a pre-takeoff roll pair and a takeoff roll pair; namely, above the rising blown film. But this is precisely where no heating is provided for the film; instead, the citation calls the stretching section "cold orientation zone". Besides, above the ultimate takeoff roll pair, no more mechanical processing takes place. Instead, a reversing roll is used for immediate routing into the horizontal orientation and ultimately, further down.

In DT 1 504 461, an internal mandrel for heating the film tube is provided. The first takeoff roll pair does not close. Stretching downstream from the first takeoff roll pair is performed by means of positive pressure flowing through.

In AT 267 160, the blown film is embossed within the take-off roll pair.

AT 342 292 provides for the tube film to be routed through a number of infrared heaters that increase the tube film temperature to the temperature required for stretching. The tube film is then stretched in the transverse direction from the extrusion direction by introducing compressed air into it through a pipe, and it is simultaneously stretched in its longitudinal direction using means that are not shown, effecting an airtight sealing of the tube and taking it off at a speed that is greater than the speed with which it is being transported by the nip rolls. In the meaning of the preceding, the means for longitudinal stretching that are precisely not shown are the nip rolls, and beyond them, apparently no further treatment is to happen; not to mention that the citation extrudes from top to bottom and is thus anyway in a position where it cannot use the rising heat as well.

CH 432 815 also deals with the design of the line upstream from the takeoff roll pair; not, however, with, e.g., the design downstream from the takeoff roll pair.

The same applies to CH 475 082.

DE 21 32 259 C3 describes rather unrelated prior art.

DE 102 42 174 A1 explains a conventional blown film line, whereby the longitudinal stretch factor, or respectively, the blow-up factor is to be set by means of the ratio between the circumferential speed of the nip rolls and the internal pressure.

U.S. Pat. No. 6,447,278 B1 discloses lateral routing of the double-layer film web away, directly downstream of the takeoff roll pair.

U.S. Pat. No. 4,086,045 again shows a cast film line, which is therefore not highly relevant here because there is no processing above the rising heat from the extruder.

U.S. Pat. No. 3,768,949 shows an early embodiment of a reversing device, with the takeoff of the tube film being performed by two individual rolls that do not press against each other as a takeoff, but which, however, together represent a takeoff roll pair in the wider meaning.

U.S. Pat. No. 3,340,565 shows rotatable chill rolls for variably setting the cooling time.

U.S. Pat. No. 3,116,787 again shows a cast film line, which is therefore unrelated prior art due to a lack of processing steps above the hot extruder.

U.S. Pat. No. 4,676,728 provides for a reversing device with vertically standing reversal bars or rolls. The same applies to U.S. Pat. No. 5,727,723.

In DE 35 08 626 C1, rolls for threading the incoming film tube can be moved apart when the blown film line starts up. This is followed by a comb-like movement against each other of the reversing bars and the reversing rolls until an operating position has been reached.

In DE 692 08 002 T2 also, longitudinal stretching of the film tube is only performed upstream from a pre-takeoff roll; i.e., not downstream from the takeoff roll pair. Besides, there is no heating taking place in the cold orientation zone there.

In GB 2 201 371 A, a tube film is first unwound from a roll, then routed upwards above a blown film line, heated there, then routed vertically downward while being inflated, and finally taken off and wound up again. Heating downstream from the takeoff roll pair is not provided for, and besides, a hot die head is not provided for so that the heat generated above the latter does not exist, and thus cannot be used.

WO 2005/102666 A1 shows a blown film line in which either the clearance between the pre-takeoff roll pair and the takeoff roll pair is adjustable by means of a vertical adjustment mechanism, or in which a carousel with different rolls is provided, whereby in both cases, the double-layer film web is routed downstream from the takeoff roll pair, first laterally and then downward.

Above the treatment roll path, a reversing bar device can be provided for, in particular, within a reversing device. By means of reversing rotation of reversing bars and/or rolls, the reversing device provides for even laying of any point in the film tube having an uneven thickness, resulting in total in quite even winding on the roll. A reversing device can be seen, e.g., in EP 0 673 750 A1.

A reversing device shall, in the context of the present patent application, not be considered a "treatment roll path".

A treatment roll path in addition also preferably comprises rolls exclusively; one could imagine also reversing bars or other means for guiding or rerouting film.

In addition, a reversing device does not include an active heating device for the double-layer film web.

The task underlying this disclosure is to provide an improvement of or an alternative to the prior art.

SUMMARY

According to a first aspect of the disclosure, the task at hand is solved by a blown film line with an annular nozzle for extruding a film tube, with a tube formation zone for laterally drawing the film tube, with a means of cooling for the ascending film tube, with a layflat unit for turning the film tube into a double layer film web, and with a takeoff roll pair located above the means of cooling for longitudinal drawing of the film tube, whereby the blown film line is characterized by the fact that above the takeoff roll pair, a treatment roll path with a means of heating the double layer film web is provided, and whereby additional characteristics are provided.

With regards to terminology, the following is explained:

The "takeoff roll pair" can—as already explained above—preferably be a simple takeoff roll pair. But it also falls under the aspect of this disclosure if a pre-takeoff roll pair is arranged upstream from the takeoff roll pair, whereby the takeoff is also often referred to as nip or nipping unit.

In the case of such an arrangement with two pairs of rolls, the ultimately nipping takeoff roll pair is usually located above the pre-takeoff roll pair.

In principle, a takeoff roll pair is distinguished from the rolls or roll pairs located below the pre-takeoff roll pair in that the takeoff roll pair routes the tube either completely, or almost completely flattened; i.e., as a double-layer film web. The takeoff roll pair grips the flattened film on both sides of its surface, also in order to reduce the possibility of compressed air being forced upwards from the interior of the film tube.

Frequently, the diameter of a takeoff roll is about 300 mm; often, diameters between 200 mm and 400 mm or more can be found. If additional pre-takeoff rolls are provided, they are frequently in the same order of magnitude as the takeoff rolls.

The "treatment roll path" is a designated transport path for the double-layer film web within which path the double-layer film web is to be subjected to mechanical treatment. Here, the idea is, in particular, irreversible stretching, especially in the machine direction; i.e., when looked at from the local level, in the longitudinal direction of film transport.

For a treatment roll path, usually, at least two, three, four, five, six or more rolls (or nipping roll pairs) are provided, whereby these usually fulfill at least two, three, four, five, six or more different functions within the treatment roll path. For the functions, the idea is, in particular: holding, heating, stretching, annealing, cooling, stretching transversely, embossing, or laminating.

One roll may perform several functions at the same time, such as holding and heating.

Normally, the least possible number of rolls is desirable.

The "means of heating" is to be an active means of heating; i.e., in particular, equipped with a heating spiral through which a current flows, an infrared radiator, a laser emitter, a hot-water flow line, an oil-fed heater, generally a fuel-fed heater with a circuit, and/or a comparable active means of heating. Extrusion generates a lot of heat. This heat will rise anyway. This and the fact that the film tube carries heat within it and into the draw results in the line components above the takeoff roll pair being quite warm anyway when the system is running. However, "means of heating" does not refer to these passively heating components. Instead, an active means of heating is indeed to be provided.

In most cases, such a means of heating can be recognized from the fact that in addition to the actual heating device, it has a temperature sensor, or that the means of heating has a control unit, in particular, with a quasi-permanent or intermittent control unit having temperature hysteresis.

In this context, it should be pointed out that whenever in the context of the present patent application, the term "control unit" is used, a technical "control unit" is addressed; i.e., with a sensor for comparing the current parameters.

Alternatively to or cumulatively with a temperature sensor on the means of heating, a means of heating is also easily distinguishable from an apparatus that has become hot during operation because the means of heating can, with a cold line already, quickly be used for heating the means of heating that is relevant here. Thus, the means of heating can be used for heating, which can be faster than the heating-up of line components in the upper part of the line during system operation would be.

Positioning "above" the takeoff roll pair shall, in an especially preferred embodiment, designate such a design in which the treatment roll path lies at least partially directly vertically above the takeoff roll pair, if projected onto a horizontal plane extending through the takeoff roll pair; i.e., that would result in intersecting with the projection of the takeoff roll pair.

It can already be sufficient if a line surrounding the treatment roll path can be thus projected. It is therefore not necessary for one of the rolls of the treatment roll path to be projectable on the horizontal plane while intersecting it, whereby the latter represents a preferred embodiment.

It is considered especially advantageous if at least one, two, three, four, five, six, or more axes of rolls of the treatment roll path lie in parallel in space with the takeoff rolls.

Each individual roll can—as already mentioned—be replaced by one pair of nipping rolls each.

Alternatively and cumulatively, the rolls of the treatment roll path can lie in the same order of magnitude as the takeoff roll pair; e.g., with diameters between 200 mm and 400 mm or more, preferably between 250 mm and 300 mm, and gladly also clearly smaller than the takeoff roll pair; e.g., with a diameter of between 100 mm and 200 mm or less.

An especially compact arrangement results when at least one roll of the treatment roll path, preferably at least half of two, three, four, five, six, or more rolls of the treatment roll path can be projected intersecting onto one or both takeoff roll(s) onto the horizontal. In such an arrangement, the rolls of the treatment roll path lie in a quite compact manner above the takeoff rolls.

Alternatively and cumulatively, it is advantageous if the rolls of the treatment roll path also overlap each other by at least half when projected onto the horizontal.

It is understood that stronger overlapping than by halves can be even more advantageous, given a suitable design.

Not quite as compact a form factor, but still lying within the expanded framework of the disclosure, would be a somewhat different geometric relationship in which the above-mentioned projections do not result directly in overlapping with the takeoff rolls. Instead, the idea is a circular encompassing line around the takeoff roll pair. The encompassing line forms a horizontally oriented, circular area. If the vertical projection of one, several or even all of the rolls of the treatment roll path falls into this area, and namely partially or even completely, a very compact system form factor is still achieved. Put simply, the rolls of the treatment roll path will then lie not necessarily exactly vertically above the takeoff roll pair, but within the closer circumference.

In a further meaning, the "above" can also be realized if—while the treatment roll path is provided laterally next to the takeoff roll pair or the upper part of the flown film line—it is, however, arranged geodetically higher than the takeoff roll pair with at least one roll of the treatment roll path, preferably with several or even all of the rolls of the treatment roll path. For a roll pair, in this context, the geodetic height of the roll pair nip shall be considered.

Particularly advantageously, the arrangement of the treatment roll path according to an aspect of the disclosure above the takeoff roll pair with a means of heating for the double layer film web can be used for heating the film above a temperature that the film has after passing through the takeoff rolls. It has already been explained that the film must have experienced cooling-off to be able to securely pass through the takeoff roll pair because this is where forces are exerted onto the film. In order to prevent damaging the film, cooling-off to a temperature below that at which dimensional stability exists must have also resulted.

It can however be advantageous for the further mechanical processing of the film, in particular in the form of stretching by means of tensile force, if the film is heated. An MDO, for example, will heat the film by means of a high-performance heating roll before the film is mechanically stretched longitudinally.

In contrast, the disclosure has recognized that the film loses temperature on its way from the upper area of the blown film line to the winder. Consequently, the heating-up for the mechanical intervention must be quite strong.

In contrast, the disclosure starts where the initial heat still exists; i.e., where the film has been cooled sufficiently for being gripped by the takeoff roll pair—or in other words, where it is still relatively warm, and thus does not need to be heated so strongly. The disclosure suggests providing for the means of heating above the takeoff roll pair, for there the means of heating does not need to reheat as much as would be necessary in other locations in the line. Thus, this arrangement results in significant energy savings for any kind of mechanical treatment requiring heat.

Such a system cannot be found anywhere in the prior art.

According to a second aspect of the present disclosure, the task at hand is solved by a blown film line with an annular nozzle for extruding a film tube, with a tube formation zone for laterally drawing the film tube, with a means of cooling for the ascending film tube, with a layflat device for turning the film tube into a double-layer film web, and with a takeoff roll pair above the means of cooling for longitudinal drawing of the film tube, whereby the blown film line is characterized by the fact that above the takeoff roll pair, a transversely arranged treatment roll path below a reversing device for the double layer film web is provided, and whereby additional characteristics are realized.

With regards to terminology, it is explained that a "transversely" arranged orientation exists when the double-layer film web runs more horizontally rather than vertically. In particular, the idea shall be a double-layer film web at least essentially extending horizontally. Given the path of the film web around rolls and reversing bars, the path can be defined by the actual film route and/or the orientation of the rotating axes of two rolls or reversing bars to each other.

In particular, the idea is that the connecting paths between two, three, four, five, six, or more rolls run either without exception, or with intermediate exceptions, more horizontally than vertically.

Especially preferably, two, three, four, five, six, or more rolls shall be arranged horizontally towards each other.

However, providing a treatment roll path with several roll pairs and intermediate stretching sections running transversely to the vertical extrusion direction is already known from U.S. Pat. No. 6,413,346 B1. But the roll pairs there lie exactly horizontally to the side of the takeoff roll pair, and then lead further downwards to a winder. A reversing bar unit is not disclosed in the citation. Thus it makes sense there to route the film web transversely to the side because it must then ultimately be routed downwards.

If a reversing unit above the takeoff roll pair existed in the citation, the film would, however, have to reemerge above the takeoff after the treatment roll path. This idea has so far kept system engineers from routing the film web transversely—much less horizontally—on the section between takeoff and reversal, which is quite short anyway. For the film web must, for each part of the path by which it is routed sideways there, be then routed back again, necessitating a plurality of rolls.

The present aspect of the disclosure has, however, recognized that it can sometimes make sense to provide for a greater number of rolls and/or reversing bars in a treatment roll path. But a blown film line with a reversing unit clearly has a lower form factor if the several rolls of the treatment roll path between takeoff and reversing unit are arranged as horizontally as possible. The lower form factor also requires a lower hall height, resulting in significant cost savings.

In addition, DE 10 2009 033 171 A1, the prior application for EP 2 277 681 A1, correctly describes:

In a method for controlling the film gauge of tube films produced in the blown film method, laid-flat in a reversing takeoff, laid down and then monoaxially stretched in machine direction, a solution shall also be found that allows producing films with a film gauge profile with the least possible variances from the mean film gauge over the width of the film. This is achieved by setting the film gauge profile of the tube film produced in the blown film line such that after longitudinal stretching, due to variances during stretching, a film gauge profile results that is uniform over the entire width of the film.

The underlying task of the disclosure is thus to create a solution that allows stretching a film produced in a blown film line, to stretch a film, after it has been laid flat in a stretching system, monoaxially in the direction of the machine in such a manner that the final films have a gauge profile with the least possible increase in thickness from the film center towards the film edges—and this namely by stretching the film from initial heat.

In a method of the type described initially for controlling film gauge, this is resolved by controlling the film gauge of the tube film produced in the blown film line in such a manner that by such stretching, a film is produced with a gauge profile with the least possible variances from the mean film gauge over the entire width of the film.

In the manufacture of these tube films, usually, film gauge profile control systems with segmented control zones are used. For this purpose, downstream from the film die head, a measuring device is arranged that records the actual gauge profile over the film's circumference. Then a comparison of the actual and the target profiles follows, and in case of variances, defined control interventions are performed on the film blowing process. The gauge profile is influenced by the segmented control zones, e.g., by conditioning the air or controlling the air volume.

After the tube film has cooled off, it is laid flat in a takeoff device, and routed over a reversing takeoff. The reversing takeoffs task is to improve the roll quality of the wound films by laying the gauge profile, which is stationary relative to the die head, across the width of the flattened film. Laying the thick and thin spots across the width of the roll results in rolls without faulty spots, the so-called piston rings.

The laid-flat tube is then routed to the stretching device and stretched monoaxially in the machine direction, and then wound onto a roll.

The measuring device for recording the actual gauge profile during the film blowing process can, as already described, be arranged between die head and takeoff, or also between takeoff and stretching system.

The procedure for controlling film gauge can also be used if the tube films are not stretched in their blocked or laid-flat state, but instead, as flat films. For this purpose, they are either slit on one side or in the center, and unfolded. It is also possible to slit the tube films open on both sides in order to stretch two equally wide webs in one stretching system each, and then wind them up.

As the film shrinks during stretching and thick spots occur in the film edge areas, the specified target value of the circumference profile is not constant during the film blowing process; instead, said target value is set in such a manner that a film having a gauge profile with the least possible variances over the width of the film results due to gauge variances after monoaxial stretching in the machine direction. For example, a tube film is produced during the film blowing process that has two thin spots located opposite each other. Then the laying flat of the tube film is performed in such a manner that the thin spots form the film edge areas, with the stretched film then having a gauge profile with the lowest possible variances from the mean film gauge. The same applies to tube films that are slit on both sides. In the case of a tube film slit on one side only, a tube film with only one thin spot will be produced during the film blowing process. In the center of this spot, the tube film will be slit in order to divide the thin spot between right and left after slitting so that after stretching, a film having a gauge profile with only minor variances results.

Downstream from the extrusion and cooling units, the film is routed to the reversing lay-flat device where the film is laid in such a manner via the reversing bars and reversing rolls of the reversing takeoff that the film always hits the horizontal reversing roll downstream from the takeoff, from where the film is rerouted vertically downwards to the stretching system. This reversing movement continuously moves the current gauge profile, which means that the specified thin spots in the film that is produced in the stationary extrusion area of the line must follow the reversing movement of the reversing takeoff so that the film with the required target gauge profile; i.e., with the thinner film edges, is routed to the stretching system. This is achieved by superimposing an offset onto the segmented control zones of the film gauge control system, which offset takes into account the angle offset from the rotating takeoff, and follows the rotation of the reversing rod.

I.e., one or several circumference points of the film laid flat in the takeoff are assigned to one or several segmented control zones. The control algorithm ensures that only the thin spots in the target profile reverse in parallel with the reversing takeoff.

For the control system, a measuring device for measuring the actual gauge profile over the width of the flat, stretched film is arranged downstream from the stretching system; i.e., in the direction of the machine downstream from the stretching gap. Said measuring device is preferably installed still within the area of the stretching system; especially, still within the treatment roll path. The specified target gauge profile for the film blowing process is calculated by means of an algorithm from the gauge profile measured downstream from the stretching system, and is corrected continuously, thus also eliminating the gauge profile variances arising from the stretching process in the finished film and resulting in an increase in roll quality, as film rolls with uniform roll diameters are to be produced.

At the same time, this results in the width of the film strips that are cut off the film on both sides during edging being clearly reduced.

In addition, the measuring device can cumulatively capture the film gauge across the width of the wound roll—the so-called roll profile—which results in the option of superimposing the target gauge profile with parameters from the actual roll profile in order to eliminate even the smallest gauge variances always occurring in the same area for the finished film, as said variances can only be detected after a longer period of time when they show up in the sum total of the changes in roll diameter.

The control parameters for controlling the individual control zones can be calculated via an algorithm from a superimposition of the following gauge profiles. These segmented control zones can be integrated into the die head, in a stationary or rotating cooling ring, or in a gauge control unit arranged downstream that moves in sync with the reversing takeoff.

Said gauge profiles are: —the base profile, which detects the actual gauge profile at the tube film's circumference between die head and stretching system; —the stretch profile, which detects the entire film width downstream from the stretching system, taking into account the angle offset from the reversing takeoff and the balancing of the gauge of the film edge area during stretching; —the roll profile, which constitutes the sum total of the stretch profiles measured, with a corresponding evaluation (thickness sum profile, which takes into account roll quality).

This represents a cascading control system, as the following control loops are superimposed: —control of the film gauge over the tube film circumference during the film blowing process; —control of the film gauge over the width of the film of the stretched film; and—control of the roll diameters across the roll width.

The target gauge profile can also be entered manually into the control system, in which case, however, it must be updated continuously with regard to the rotation of the reversing rods.

The procedure for controlling film gauge can also be used in lines that do not have a reversing system installed.

The treatment roll path can have a temperature control system that allows the means of heating to heat the double layer film web at the beginning of the treatment roll path by less than 80 K; preferably, by less than 30 K.

It is irrelevant whether the control system detects the current temperature, e.g., from the double layer film web or from the roll surface, if a heating roll is used. In practice, a variant is preferred in which the temperature of a fluid return from the roll is measured.

Theoretically, the control system can function completely without a temperature sensor, for with a preset temperature curve of the melt at the die head, and downstream from that, increasing up to the takeoff, it is known relatively precisely what the temperature is with which the double layer film web enters the treatment roll path.

The trick with the means of heating within the treatment roll path is to provide for heating that, however, lies only slightly above the incoming temperature of the double layer film web.

Generally it shall be pointed out that the temperature information provided here in the context of the present patent application shall be understood as technical mean temperatures. In practice, the temperatures fluctuate over the length of a roll; i.e., over the width of the film web, usually by 1 to 4 K at any rate.

This allows optimizing the energy footprint of the blown film line: The cooling of the film tube being drawn upwards is adjusted in such a manner that the latter is just sufficiently cool upon reaching the calibrating cage and at the takeoff rolls. Said tube then passes through the mechanically critical point at the takeoff roll and need then only be heated up by a very small measure in order to be easily stretchable.

For example, polypropylene can be used for the films. In endothermal processes; i.e., during melting and extruding, melting occurs at about 160° C. to 168° C. While rising, i.e. during the cooling of the film, crystallization, however, occurs at about 115° C. to 135° C. Below these temperatures, the double-layer film web can be reliably nipped by the takeoff roll pair, and thus drawn. Consequently, downstream from the takeoff roll pair, heating up by e.g., about 10 K to 50 K is already sufficient—while the film is not brought back to its melting point but still—for a reliable stretching process of the film web.

Additionally it shall be assumed, e.g., that the room air temperature $T_U$ at the erection location of a blown film line is about 30° C. In conventional systems, the film web will then reach the stretching device at about 30° C.; usually, with a slightly higher temperature. However, due to the strong movement of air at the film web's surface—due to the fast forward movement of the film web—a fast drop in temperature can generally be observed as soon as the film web is routed off to the side after is has passed through the takeoff. For at the takeoff, the double-layer film web usually has a temperature of between about 60° C. and about 80° C.

For the scheduled transverse stretching process at a layflat package, however, temperatures of around 80° C. are usually sufficient. For a pre-stretch process of an MDO, temperatures of around 85° C. are usually sufficient. And for stretching in the context of an MDO, temperatures of around 100° C. to 105° C. for polyethylene, from 130° C. to 140° C. for polypropylene, and about 70° C. for polyamide should prevail in the film web. Thus, directly downstream from the takeoff, depending on the application, heating by only few K will suffice, or even merely maintaining the temperature, which is also made possible by a means of heating.

In an especially preferred embodiment, the treatment roll path has a heating roll for heating the double-layer film web for easier treating within the treatment roll path.

A heating roll is a roll that engages mechanically with the double-layer film web as soon as the blown film line is operating. The double-layer film web contacts the heating roll along a predetermined section of the roll surface, defined by the arc of contact. In particular during this contact phase, good heat radiation occurs from the heating roll to the film.

The heating roll itself is preferably embodied as an active means of heating in its interior; e.g., as close as possible to its surface.

A heating station for the double-layer film web can also be embodied differently than as by means of a heating roll; e.g., as a heating section with radiant heaters.

An analogous idea can also be transferred to any and all of the following types of "rolls" that shall be understood only as—albeit preferred—examples for "stations".

Preferably, the heating station; i.e., above all, heating roll, has a temperature measuring device so that it can be variably adjusted within a fixed temperature interval that can be preset. This temperature interval shall be adjustable in such a manner that the resulting temperature of the exiting double-layer film web lies by less than 80 K, preferably less than 30 K or 20 K, above that of the entering double-layer film web.

Three examples for clarification:

In a layflat package within the treatment film path, the incoming temperature of the double-layer film web can, e.g., be 60° C.; i.e., a usual temperature at the takeoff roll pair. If a temperature of 80° C. is desired for stretching transversely in the frame of the layflat package, the heating station is to heat the double-layer film web by only about 20 K. Compared to a conventional line in which the double-layer film web is, e.g., first stretched transversely on the hall floor; i.e., with an incoming temperature at the layflat package of about 30° C.—which requires reheating by 50 K—an energy amount for reheating by 30 K will now be saved.

It is proposed that the double-layer film web be temperature-elevated between plus 5 K and plus 80 K in the heating roll process; preferred values are around plus 5 K to plus 20 K for a layflat package, especially with a process temperature of about 80° C.;

plus 5 K to plus 25 K for prestretching; especially with about 85° C. in the process.

It is proposed that the treatment roll path have a stretching section for longitudinal drawing of the double-layer film web.

Above it has already been explained that a stretching section design is implemented by first providing a holding roll or another means of holding in the machine direction, whereupon the stretching section has on its side facing away from the machine a stretching roll, or as explained above, a stretching roll pair for transporting the double-layer film web faster than at the holding roll.

For example, given equally large diameters of a holding roll and a stretching roll, a higher rotational speed may be set for the stretching roll, and a lower rotational speed may be set for the holding roll. In both cases, this refers to the circumferential speed amounts. Depending on how the film runs through the treatment roll path, a stretching section can be achieved both by means of rolls running with the same orientation, as well as by means of rolls running with the opposite orientation. If the film crosses the direct connection of the two roll axes within the stretching section, the rolls shall run in the opposite direction; otherwise, in the same rotational direction.

A stretch ratio within the stretching section is preferably 1:2 to 1:4; in particular rather 1:2 for prestretched film for agricultural applications. Generally, a stretch ratio within the stretching section of 1:2 to 1:10 is to be considered advantageous; in particular, however, the initially mentioned framework of 1:2 to 1:4.

A transverse stretching ratio within the stretching section is more than 1:1; preferably, however, only up to about 1:1.05.

The holding roll can preferably take on two functions; e.g. be embodied by a heating roll, or embody a heating station in a different manner.

Generally it shall be pointed out that within the context of the present patent application, the indefinite terms designating numbers "one", "two" etc. are not to be understood as "exactly one", "exactly two" etc., but normally, as indefinite articles. A statement of the kind of "one . . . ", "two . . . " etc. is thus to be understood as "at least one . . . ", "at least two . . . " etc. unless the respective context shows that only "exactly one", "exactly two" etc. are meant.

In an especially far-reaching idea, even the takeoff roll or the takeoff roll pair—ideally in the form of a nip roll pair—can constitute the means of heating, and potentially even be used simultaneously as a holding roll. However, as a rule, this will result in an impaired embodiment because a heated takeoff roll always carries the risk with it that it heats the film too much while the film is still in the technical intervention of taking off, and to thus damage the film uncontrollably. Ultimately, the takeoff roll pair works indirectly as a holding mechanism for the treatment roll path too because it specifies a defined, rather narrow speed range. Yet, for the reasons explained before, it is preferred for one roll to be provided as a holding roll between the takeoff roll pair and the stretching roll that clearly transports faster, which holding roll transports slowly, at least as compared to the stretching roll.

The stretching section or stretching length as such can ideally have a length of 120 cm at most; in particular, a length of no more than 50 cm or 15 cm; especially no more than 10 cm or 5 cm.

Tests conducted by the inventors showed that a stretching section as short as possible is advantageous for minimizing the transverse shrinking of the double-layer film web. On the other hand, the threading of the double-layer film web upon line startup is made significantly easier if there is a clearance of at least 5 cm, preferably of at least 10 cm, between the rolls of the treatment roll path. It is then easier to thread the front end of the film in between the rolls.

It is considered advantageous if at least one of the rolls forming the treatment roll section is shiftable or pivotable from its position to make threading easier. This principle can be adopted from U.S. Pat. No. 4,086,045 without an inventive step.

It is proposed that the treatment roll path have, downstream from the stretching roll, an annealing roll or an annealing roll pair, or an annealing station designed otherwise, for relaxing the double-layer film web after stretching.

The inventor's prototype tests have shown that a memory effect in the film stretched in the machine direction in the stretching section can be reduced significantly if the stretching section is followed by a second active heating device; in particular, in the form of an annealing station with an annealing roll.

The first annealing roll can also be represented by the stretching roll, and/or one or several separate annealing rolls can be provided for.

In the annealing section, the double-layer film web is to assume a temperature of between minus 5 K and up to plus 30 K; preferably, between around plus/minus 0 K and plus 20 K—each relative to the temperature of the double-layer film web in the stretching area.

Especially preferably, the stretching roll is simultaneously embodied as a first annealing roll that can be followed by an additional first or even a second additional annealing roll.

Preferably, several annealing rolls have the same temperature setting; i.e., they are set such that they provide the double-layer film web with the same temperature in the process. In practice this will, e.g.,—while accepting variances—be easily set based on the return of heating fluid set to the same temperature.

It is not a deviation from the idea of the "same temperature setting" if subsequent rolls lend the double-layer film web slightly different temperatures, in particular, at a fluctuation range of plus/minus 5 K or plus/minus 10 K.

It can be desirable to generate a focused rising or falling temperature cascade in the double-layer film web by means of the heating and/or annealing rolls.

Generally any station; i.e., especially heating station, annealing station and cooling station, can have several rolls that have to be passed by the double-layer film web in succession. This makes setting the film temperature to the desired values easier.

Finally, it is suggested that the treatment roll section have a cooling station for the double-layer film web; in particular, a chill roll, especially with an active means of cooling.

In the above-mentioned temperature cascade, it is proposed that the cooling station lend the double-layer firm web a jump in temperature of between minus 5 K and minus 80 K; in particular, between minus 10 K and minus 20 K; in particular to about 60° C. and/or about up to room temperature, and/or up to about 40° C. to 60° C. Any existing reversing device will also reliably operate at film temperatures of about 60° C.

A chill roll can be considered as a chill roll already if it does not have any active means of heating. Preferably, however, it will have an active means of cooling.

In particular, a chill roll can have an express means of heat dissipation; e.g., a water circuit or another fluid circuit for a coolant which is routed into the chill roll and again out of the chill roll by means of a line.

In a preferred embodiment, a heat exchanger, an electrically powered fluid pump, and/or a refrigeration pump are integrated into the circuit and connected to the chill roll.

The treatment roll path can advantageously have a control system for improving flatness, whereby longitudinal stretching of the double-layer film web by 0.5% to 5% is performed.

Alternatively, the treatment roll path can have a control system for a stretching system, and namely with longitudinal stretching of a double-layer film web by more than 5%; preferably, by more than 100%, or by more than 500%. Above, data on a possible configuration for stretching; i.e., as an MDO, have already been stated, with a stretching ratio within the stretching section ranging ideally from 1:2 to 1:10, and/or with a stretching ratio from the holding roll to the chill roll of ideally 1:2 to 1:4.

Above, possible temperature jumps between the process temperatures of the double-layer film web from the rolls or otherwise embodied stations within the treatment roll path have already been explained.

Independently of the additional framework parameters listed above, it is proposed that the treatment roll path have a heating roll for the double-layer film web with a temperature step of plus/minus 0 K, or of plus 1 K to plus 80 K, or more in the case of fast-running double-layer film webs, in particular polypropylene, in particular, as compared to the preceding station as seen in the machine direction, and/or the roll temperature of the takeoff roll.

Alternatively and cumulatively, it is proposed that the treatment roll path have a stretching roll for the double-layer film web with a temperature step of minus 10 K, preferably of plus 5 K, up to plus 30 K, or of plus 50 K or more in the case of fast-running double-layer film webs, as compared to the preceding station as seen in the machine direction.

Alternatively and cumulatively, it is proposed that the treatment roll path have an annealing roll for the double-layer film web with a temperature step of minus 10 K, preferably of plus 5 K, up to plus 30 K, or of plus 50 K or more in the case of fast-running double-layer film webs, as compared to the preceding station as seen in the machine direction.

Alternatively and cumulatively, it is proposed that the treatment roll path have a chill roll for the double-layer film web with a temperature step of minus 10 K to minus 80 K, or of minus 100 K in the case of fast-running double-layer film webs, as compared to the preceding station as seen in the machine direction.

In order to have the overall line built with the lowest form factor possible, in particular if a reversing unit is arranged above, it is proposed that the treatment roll path have two transversely aligned subsections in the path of the double-layer film web; preferably three transversely aligned subsections, in particular each bridging a vertically rising direction above the takeoff roll pair.

As has already been explained above regarding a "transversely" arranged alignment, the latter shall be the case already if—as viewed from the side of the rolls; i.e., in parallel with the direction of the rotating axes of the rolls—the direct connection between two subsequent rolls is more horizontal rather than vertical; i.e., a max. of 45° from horizontal; preferably, a max. of 30°, preferably a max. of 15°, 10°, or 5°.

Relevant for the built height is not so much the route of the film as instead, the arrangement of the individual rolls. Depending on the predetermined arrangement of the rolls, the film can be routed to run around on the one or the other side; it does, however, not claim any real built height due to its practically negligible thickness.

Here, it can even be advantageous if the film lies less horizontal in the transversely arranged subsections than the connection between the two axis rolls.

The characteristic described above, that a subsection bridges a vertically rising direction above the takeoff roll pair must be understood such that the planned film path between the two subsequent rolls crosses the virtual, vertically arranged plane that lies above the nips of the takeoff roll pair.

In such a design, there are also rolls arranged on both sides of the plane rising vertically upward above the takeoff roll pair, with the film running over the sides; preferably running back and forth, so that a rather long film path is achieved for the treatment roll path while at the same time, keeping the built height low.

A preferred embodiment of the disclosure provides for the treatment roll path to have three transversely arranged subsections, in particular only once bridging a vertically rising direction above the takeoff roll pair.

In such a design, e.g., four rolls are at least essentially arranged in one line, and namely in a line lying transversely to the rising direction, preferably almost or exactly horizontally.

For threading, the treatment roll section can have a threading-assist with a shiftable or pivotable roll. This has already been explained.

According to a third aspect of the disclosure, the task at hand is solved by a method for manufacturing a blown film web in a blown film line, particularly in a blown film line as described above, with the steps:

Extruding a film tube;

Inflating the film tube in a tube forming zone for drawing the tube laterally;

Cooling the rising film tube with a means of cooling;

Laying the film tube flat into a double-layer film web with a layflat unit;

Taking off the double-layer film web with a takeoff roll pair while longitudinally drawing the film tube;

whereby the method is characterized by the further steps of:

Routing the double-layer film web above the takeoff roll pair further up and through a treatment roll path with a means of heating for heating the double-layer film web; and Treating the double-layer film web in the treatment roll path; in particular, stretching the double-layer film web in a stretching section of the treatment roll path, as well as by the control step.

It has already been explained above that these processing steps are highly advantageous. The fact that the film in the shape of the double-layer film web continues to be routed upwards above the takeoff rolls eliminates a long web path, which prevents the film from further cooling off, which uses up energy, downstream from the takeoff roll pair.

Thus, the film can be brought to a better processable temperature level from first heat using only little additional energy, and it can then, e.g., be stretched, in particular transversally or longitudinally, or treated otherwise; e.g., the surface can be treated, and/or the film can be embossed, and/or components can be attached or inserted, such as active or passive oscillating circuits (often called RFID chips), and/or the film can be irradiated, and/or the film can be laminated, and/or corona treatment of the surface can be performed, and/or the film can be embossed, and/or an adhesive can be applied, and/or a lubricating agent can be applied, and/or a defogging-coating can be applied, and/or targeted annealing of the double-layer film web for supporting the migration of fillers can be performed if filler materials are to migrate to the film surface in order to have an effect there so that a downstream temperature conditioning process or storing can be dispensed with, whereby migration is essentially a function of temperature.

And/or targeted influencing of the film's shrinkage parameters can be performed. By means of sufficiently long annealing, shrinkage after stretching can be reduced, all the way up to a so-called "dead film" without any shrinkage. Alternatively, the shrinkage parameters can be increased, in particular the shrinkage parameters in the machine direction, by focused "freezing" of strains.

And/or targeted setting of the curling tendency up to preventing a curling tendency in asymmetrical film structures is performed.

For the above applications, the method described here and the blown film line described here can be advantageously put to targeted use.

For threading the double-layer film web upon line startup, one or several rolls of the treatment roll section can be slid or pivoted from their operating positions, and after threading the double-layer film web can be tensioned by means of sliding or pivoting the rolls back.

Finally, according to a fourth aspect of the present disclosure, the task is solved by a film manufactured with a blown film line and/or by means of a method as described above.

Both the line and the method have a noticeable and comprehensible effect on the finished film: for a film that has been stretched especially homogenously biaxially will result if the molecules from initial heat are immediately reheated and then stretched, instead of having them cool off first.

I.e., once the film has cooled off, it naturally must—in order to be able to run the blown film line cost-effectively—be heated to the desired high temperature range rather quickly, which will result in the film characteristics described that cannot be uniformly predicted.

The quality of the film product manufactured by means of the proposed method is thus also advantageous, which can be demonstrated in the film, as long as the parameters are set suitably according to the present disclosure during blown film production.

BRIEF DESCRIPTION OF THE DRAWINGS

In the following, the disclosure is explained in greater detail based on six exemplary embodiments with reference to the drawings.

In the drawings.

DETAILED DESCRIPTION OF THE DRAWINGS

Figure 1:
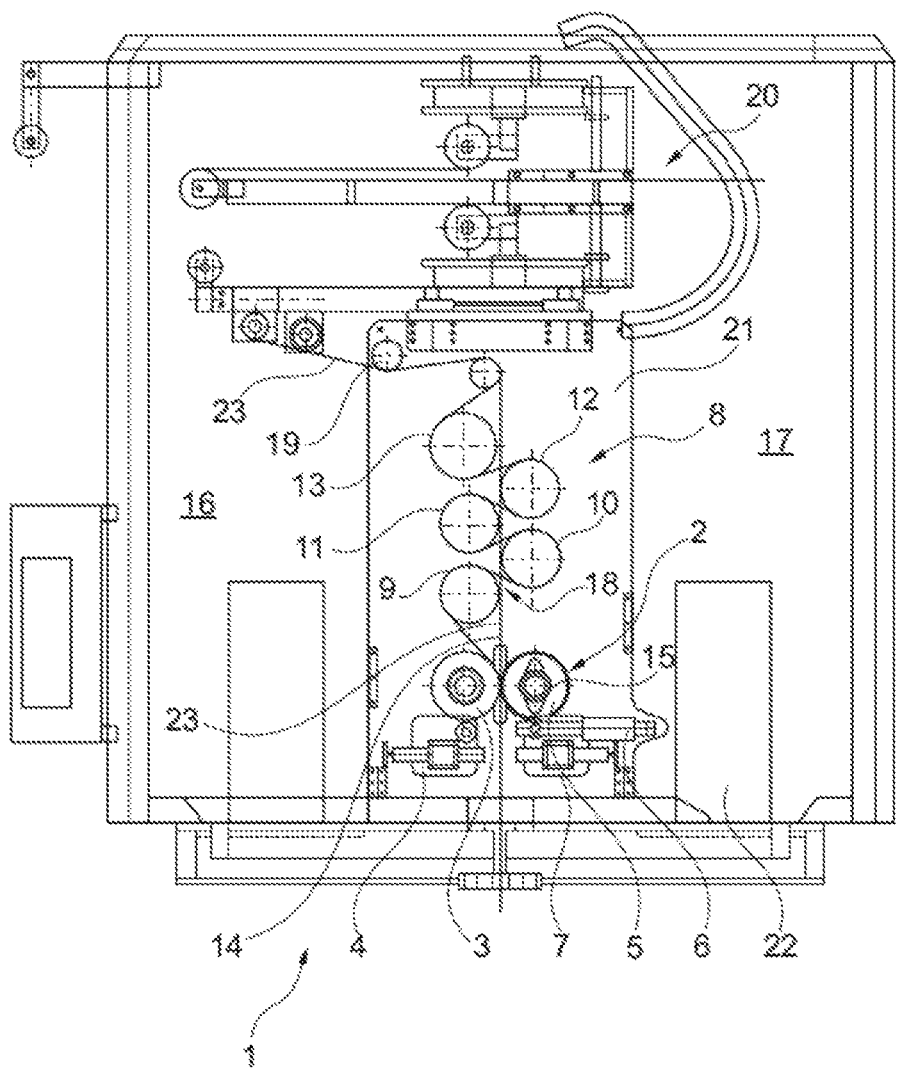
FIG. 1 shows schematically, as a vertical section perpendicular to a takeoff roll pair, a first variant of a treatment roll path with five rolls and a reversing device arranged above the latter.

Blown film line 1 (upper area shown only) in FIG. 1 includes an extruder, a die head with an annular slit die, a rising section arranged above the latter for an extruded film tube, a calibrating cage, a layflat frame, and a takeoff roll pair 2 above the layflat frame, whereby a first takeoff roll 3, which is finely adjustable in its position is supported by a first bracket 4, while a second takeoff roll 5 is supported on a sliding bearing mount 7 to be horizontally slideable by means of servo cylinder 6. Servo cylinder 6 can thus move second takeoff roll 5 horizontally towards and away from the first takeoff roll 3.

Above takeoff roll pair 2, a treatment roll path 8 is provided. In the latter, there are a total of five rolls, namely a first roll 9, a second roll 10, a third roll 11, a fourth roll 12, and a fifth roll 13.

The five rolls of treatment roll path 8 are alternately arranged on different sides of a virtual plane 14 that lies in parallel with center shafts 15 (identified as examples) of the two takeoff rolls and runs vertically through the nip between the two takeoff rolls. The virtual plane contains the area which the laid-flat film would move through if the laid-flat film would simply rise vertically upwards coming from the nip of the takeoff rolls. In the vertical sectional view perpendicular to center shafts 15, virtual plane 14 thus shows as a vertically running line, namely following the vertical direction of the film's rising, and starting at the nip of the takeoff roll pair.

First roll 9, third roll 11, and fifth roll 13 lie on a first side 16 of virtual plane 14; second roll 10 and fourth roll 12, however, lie on an opposite second side 17 of virtual plane 14.

At the same time, all five rolls of treatment roll path 8 are set so closely together vertically that, in the case of horizontal projection of the rolls onto virtual plane 14, one overlap each of first roll 9 with second roll 10, second roll 10 with third roll 11, third roll 11 with fourth roll 12 and fourth roll 12 with fifth roll 13 results, and namely each about by a third of the entire diameter size of the five rolls.

The first four rolls 9, 10, 11, 12 of treatment roll path 8 are embodied to be the same size, while the two takeoff rolls 3, 5 of takeoff roll pair 2 and fifth roll 13 are embodied larger.

Clearances 18 (identified as examples) of the five rolls of treatment roll path 8 between each other are at least 50 mm each.

First roll 9 is equipped with a speed control unit so that its surface speed during a rotation can be adjusted quite precisely to a specified amount.

Second roll 10 is equipped with a drive and a speed control unit that can adjust roll 10 to a clearly higher circumferential speed than first roll 9.

Third and fourth rolls 11, 12 can be drivable, then e.g. at a same speed as second roll 10, or preferably more slowly than second roll 10.

Fifth roll 13 can also be drivable, then e.g. at least at essentially the same speed as fourth roll 12, or preferably more slowly than fourth roll 12.

It should be noted here that it can be advantageous to slow down after a stretching process in order to let stresses in the film dissipate.

First roll 9 is also equipped with an active means of heating and a temperature sensor (neither one shown), namely piping for a heating fluid with a heat-conducting connection to the surface of first roll 9, while the temperature sensor can either record the surface temperature of first roll 9, and/or of the running double-layer film web by means of no-contact measuring.

Preferably, the temperature sensor is arranged in a heating fluid return so that, while accepting a certain imprecision, it can be assumed that the film will run somewhat cooler that the return line temperature of the heating fluid is.

Ideally the process temperature of a double-layer film web will assume exactly the temperature of the roll surface. In practice, however, the running film will always be a bit warmer or cooler, depending on whether it was cooled or heated by the roll.

The person skilled in the art can, for implementation in an especially precise embodiment, measure the process temperatures of the individual rolls; e.g., non-contact via infrared sensor, and adjust the roll temperatures according to the actual film temperatures.

Second roll 10, third roll 11, and fourth roll 12 can, independently of each other, each also be equipped with such an active means of heating.

At any rate, one roll—here fifth roll 13—is equipped with a temperature measuring device and an active means of cooling.

Above treatment roll path 8, two non-driven reversing rolls 19 (identified as examples) are arranged on the way to a reversing unit 20 arranged above takeoff roll pair 2 and treatment roll path 8, whereby reversing rolls 19 and reversing unit 20 are known from prior art and shall thus not be further explained here.

Both the two takeoff rolls 3, 5 of takeoff roll pair 2 and the five treatment rolls of treatment roll path 8 and ultimately also reversing rolls 19 are supported at their faces on a machine rack 21.

On the side of machine rack 21, two temperature conditioning devices 22 (identified as examples) are provided. By means of temperature conditioning devices 22, the temperature-conditioned rolls of treatment roll path 8 are connected by means of coolant lines or means of heating agent lines, preferably also by means of temperature sensor data lines (not shown). Contained in temperature conditioning devices 22, or at any rate, having access to the temperature conditioning devices 22, electronic microcontrollers (not shown) are provided, which can control the set temperature of the temperature-controlled rolls, based on the fluid return.

In the operation of blown film line 1, a film tube (not shown) is extruded by the extruder (not shown) through the annular slit die (not shown). The film tube is drawn upwards along blown film line 1, through the calibrating cage (not shown) and the layflat unit (not shown). At the end of the layflat unit, the film tube is mostly flattened and enters takeoff roll pair 2 in this shape. From there on, word shall be of a double-layer film web 23.

Double-layer film web 23 can optionally be routed in a straight upward direction above takeoff roll pair 2, congruent with virtual plane 14, through rolls 9, 10, 11, 12, 13 of treatment roll path 8, and immediately to reversing rolls 19, and from there to reversing unit 20.

In this case blown film system 1 corresponds to a conventional blown film system. The reversing unit rotates during operation of blown film line 1 and thus generates on a roll (not shown) on the floor of the erection area (not shown) a film roll that shall be wound as uniformly as possible.

In an alternative—and here, preferred—film routing path, however, double-layer film web 23 is routed around each of the five rolls 9, 10, 11, 12, 13 of treatment roll path 8; whereby—due to the rolls' geometry among each other—an arc of contact of more than 180° results, at any rate, on second roll 10, third roll 11, and fourth roll 12. The arc of contact of first roll 9 is governed, in particular, by the positioning height of first roll 9 vis-a-vis takeoff roll pair 2, as well as by the diameters of the three rolls and in addition, by the clearance between first roll 9 and virtual plane 14. In the arrangement selected here, the arc of contact at first roll 9 is about 170°.

The same applies to fifth roll 13, whereby here, in particular, the positioning vis-a-vis virtual plane 14, first reversing roll 19, and the diameter between fifth roll 13 and first reversing roll 19 are relevant.

1] In the configuration described, double-layer film web 23 then runs in the direction of extrusion; i.e., in machine direction, upwards through takeoff roll pair 2, and is then first routed clockwise (all information regarding clockwise/counterclockwise refers to the section views of the Figures) around first roll 9. First roll 9 is used as a holding roll. At the same time, a first of a total of three warming agent or coolant circuits flows through first roll 9 within treatment roll path 8; i.e. a heating circuit.

Given a configuration of the first variant of blown film line 1 in FIG. 1, the double-layer film web 23 can, e.g., come from takeoff roll pair 2 at an incoming film temperature of about 60° C. to about 80° C.

First roll 9 is set in such a manner that its circumferential speed is the same as the one double-layer film web 23 experiences also in takeoff roll pair 2. In the clearance between takeoff roll pair 2 and first roll 9, double-layer film web 23 thus does not experience any mechanical influence.

Due to the large arc of contact of double-layer film web 23 around first roll 9, double-layer film web 23 runs on first roll 9 with adhesive friction; thus exactly at the same speed as the one determined by the roll surface, even if the adhesive friction does not exist across all of the arc of contact.

The first temperature circuit; i.e., the heating circuit that flows through first roll 9 in its function as a holding roll is, e.g., set to a temperature differential generation in the film of between plus 5 K and plus 10 K, relative to the film temperature at the exit from the preceding first takeoff roll 3. Double-layer film web 23 is thus heated by about plus 5 K to plus 10 K when it goes around first roll 9. This minor temperature differential is already sufficient for significantly increasing the processability of double-layer film web 23, for blown film line 1 is (below the areas shown in FIG. 1) set in such a manner that the film does not cool off until it is rising and thus, when passing takeoff rolls 3, 5, still has a temperature that is quite high—between 60° C. and 80° C. in the tested example.

Thus, with only very little energy, which must be provided by temperature conditioning device 22, the film can be brought to a very well processable temperature level in order to make longitudinal stretching easier.

Second roll 10 is embodied as a stretching roll in the exemplary embodiment shown. In the positive tests, it was driven at triple or quadruple the circumferential speed relative to first roll 9. With stretch ratios trending more towards 1:3, a film quality resulted that seemed more suitable for silage prestretch; at higher stretch ratios, however, i.e., trending more towards 1:4 or above, a wider range of processability resulted; in particular with regard to the visual film qualities.

In the positive test, second roll 10, i.e., the stretch roll, was used as the first of a total of three rolls of a second temperature circuit; i.e., an annealing circuit. The annealing circuit flows through second roll 10, third roll 11, and fourth roll 12. The temperature in the annealing circuit return was set at plus 5 K to plus 20 K relative to the return of preceding first roll 9; i.e., the holding roll.

Thus, second roll 10 has two functions: it is both a stretching roll and an annealing station in the shape of a annealing roll.

Third roll 11 and fourth roll 12 are embodied as annealing rolls; i.e., they maintain the rather high temperature level of the stretching roll, at least essentially, and thus result in relaxation of the transversely stretched double-layer film web 23, which helped minimize a memory effect of the reshrinking that would have otherwise occurred.

Fifth roll 13, embodied as a chill roll, is connected to the third of the three temperature circuits; namely a cooling circuit. The temperature level in the cooling circuit return was ideally between minus 10 K and minus 20 K relative to the return of the preceding roll; i.e., the most recent annealing roll.

On all five rolls of treatment roll path 8, double-layer film web 23 runs mostly with adhesive friction. Ideally, the five rolls are thus surface-coated; the idea is, in particular, spiral muting or silicon coating.

It is understood that for each roll, at least one contact roll or pressure roll can be provided. But in the prototype tests, running without contact rolls has proven to be quite sufficient.

Water has proven itself as heating and cooling medium for temperature conditioning devices 22 and the three temperature conditioning circuits.

At its discharge section, blown film line 1 was run with a film speed between 94 m/min and 340 m/min, and with a stretch ratio of 1:2 and 1:3 between first roll 9 and fifth roll 13; whereby again the lower stretch ratio; i.e., trending towards 1:2, seemed suitable more for silage prestretch products.

Implementing the different disclosure aspects, blown film line 1 provides, above takeoff roll pair 2, a treatment roll path 8 with a means of heating for double-layer film web 23; namely with the heated fluid circuit in first roll 9 and additionally with the annealing circuit in second roll 10, in third roll 11, and in fourth roll 12.

Thus, present here, even several active means of heating for double-layer film web 23 are provided; namely in a total of four different rolls.

Providing a means of heating in several rolls, two rolls at least, especially with two different fluid circuits, is also an advantage per se.

Implementing the second aspect of the disclosure, above takeoff roll pair 2, a transversely oriented treatment section is provided each, for from roll to roll within treatment roll path 8, the rolls are oriented at an angle of about 35° to 40° from horizontal; i.e., they are oriented more horizontally than vertically towards each other. This results in the rolls, due to their sufficient lateral offset, being arrangeable in such a low form factor that they, in a projection [onto] virtual plane 14, result in overlaps; so, in total are less high than what the addition of the five rolls' diameters would amount to.

Figure 2:
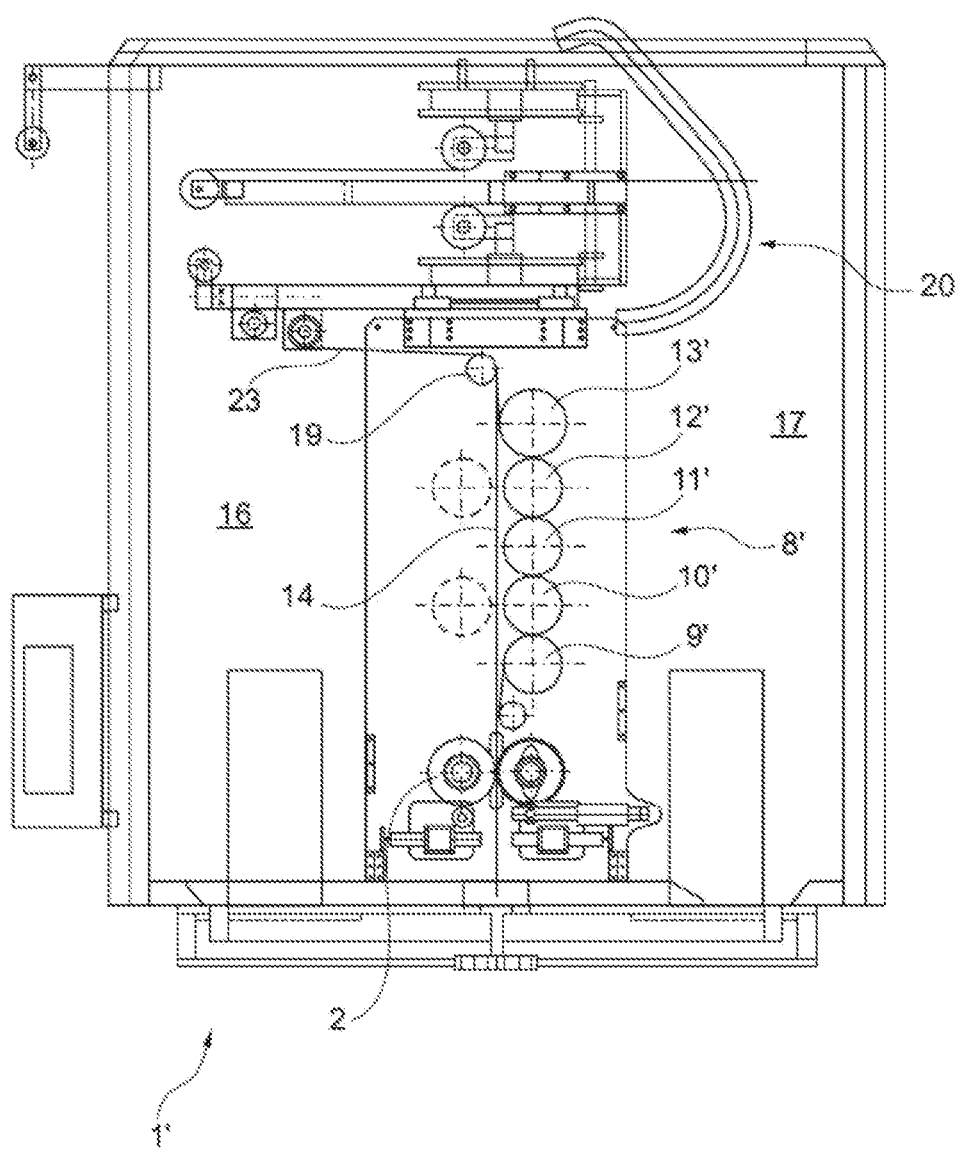
FIG. 2 shows, in a view otherwise unchanged from FIG. 1, a second variant of a treatment roll path with five rolls and a reversing device arranged above the former.

In the second variant of a blown film line 1' in FIG. 2, the line can be embodied identically or similarly up to takeoff roll pair 2.

Above takeoff roll pair 2 and below reversing unit 20, again, five rolls are arranged; namely, a first roll 9', a second roll 10', a third roll 11', a fourth roll 12', and a fifth roll 13', before next, at the top, a reversing roll 19 is provided.

The five rolls perform the same function as described in the first variant from FIG. 1, and the same three temperature conditioning circuits are also present.

However, in the second variant, second roll 10' and fourth roll 12' are arranged on the same side of virtual plane 14 as first roll 9', third roll 11', and fifth roll 13'. I.e., all rolls are arranged on the same side of virtual plane 14.

A direct connection between the nip of takeoff roll pair 2 and reversing roll 19 is free so that double-layer film web 23 can either be routed rising directly upwards without going around the rolls in treatment roll path 8.

Preferably, however, this line is also arranged as an MDO line; i.e. for longitudinal stretching of the film beyond the plastic flowing of double-layer film web 23.

The five rolls of treatment roll path 8 have very little clearance from each other; it is below 5 cm, at any rate. Thus, when starting up blown film line 1', it is very difficult—in the shown operating position of the rolls in treatment roll path 8—to thread the film in between them, even if each of the rolls is driven in the opposite direction from its predecessor.

Consequently, for threading a beginning (not shown) of double-layer film web 23, two rolls—namely second roll 10' and fourth roll 12', can be shifted to the left, i.e., the opposite side of virtual plane 14. Then, double-layer film web 23 can simply be threaded through the five rolls, and then second roll 10' and fourth roll 12' will be moved back to the same side 17 of virtual plane 14, just as the remaining rolls are positioned, and the extrusion process can be run as a steady-state process.

Preferably, second roll 10' can optionally be adjusted up to the imaginary plane made up of the axes of rolls 9', 11', 13', or even beyond this plane, resulting in a variably adjustable stretching section. In preliminary tests, adjustability of the stretching length has proven to be advantageous from a process technology point of view; e.g., because a higher error tolerance for faulty spots resulted if the imaginary plane was passed through.

In the threading position of second roll 10' and fourth roll 12', blown film line 1' can be operated like a conventional blown film line.

Figure 3:
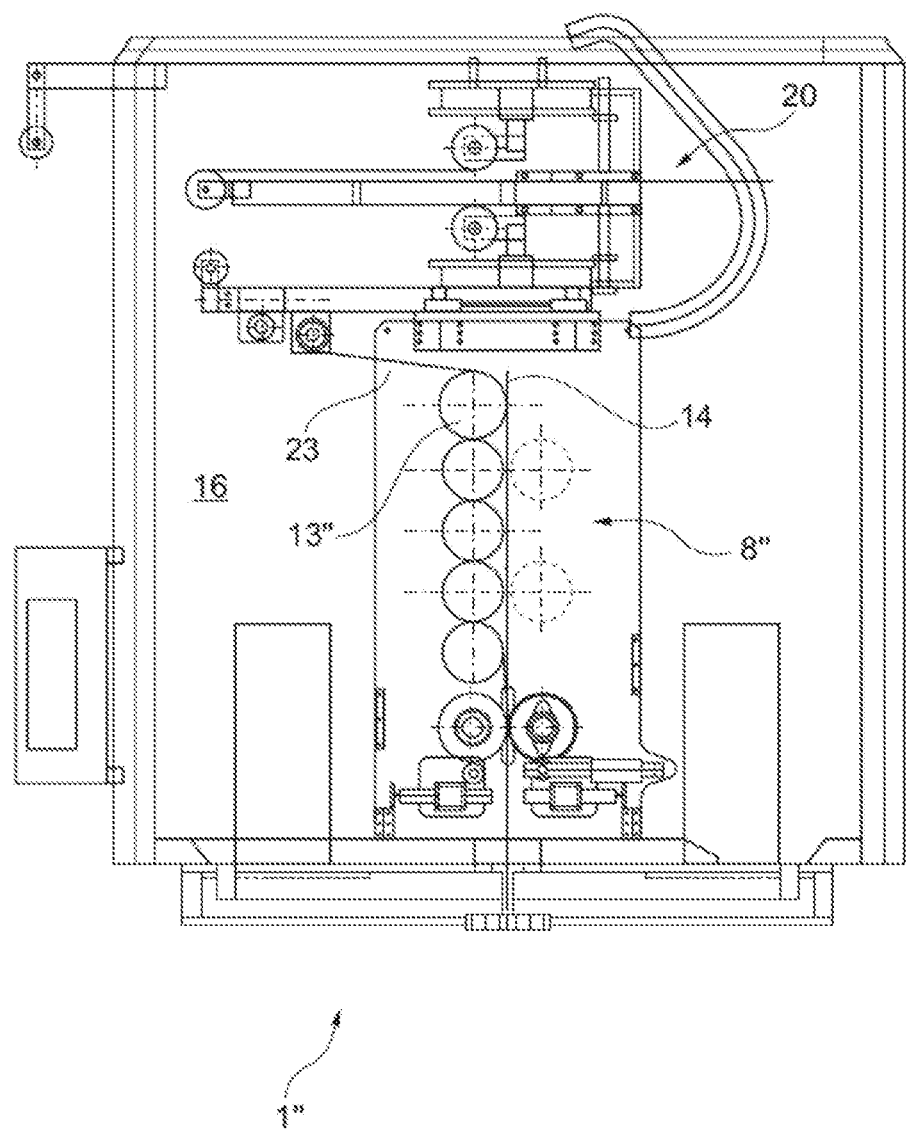
FIG. 3 shows, in a view otherwise unchanged from FIG. 1, a third variant of a treatment roll path with five rolls and a reversing device arranged above the former.

In the third variant of blown film line 1" in FIG. 3, essentially the same design was chosen as in the second variant of blown film line 1' in FIG. 2; however, the five rolls of the treatment roll path 8" are all located on the first side 16 of virtual plane 14. As an infeed side to reversing unit 20 is also located on the first side 16 of virtual plane 14, routing is possible directly from fifth roll 13" to reversing unit 20. A reversing roll 19 is not necessary.

In addition, fifth roll 13" has been arranged relative to the four preceding rolls in such a manner that its edge that faces plane 14 protrudes over the four preceding rolls so that double-layer film web 23 can be routed around the four preceding rolls without threading and without passing treatment roll path 8. Despite this, the arc of contact of double-layer film web 23 around the fifth roll 13" is almost 90° even without threading, and in the threaded state, it is even almost 180°, so that sufficient guidance is ensured.

In the third variant of blown film line 1" in FIG. 3—as in the second variant of blown film line 1' from FIG. 2—combing of the second and fourth rolls is provided for so that the beginning of the film can be threaded by simply guiding it straight in when the line is started up.

Figure 4:
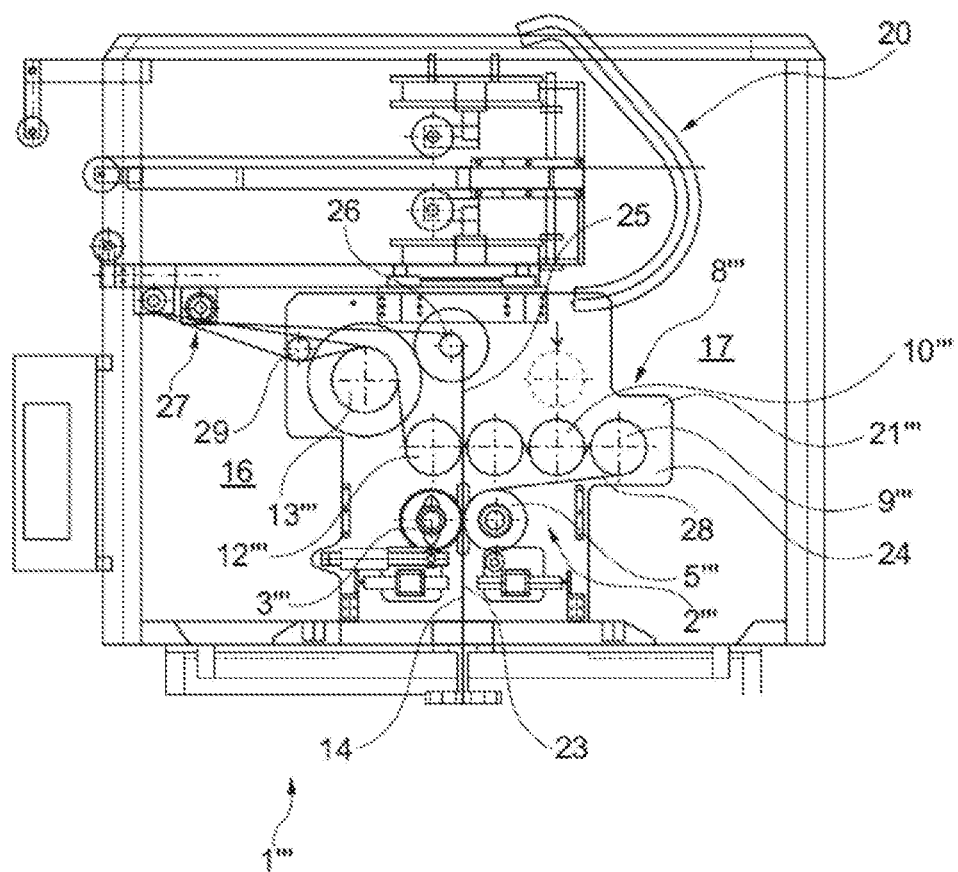
FIG. 4 shows, schematically as a vertical section through a takeoff roll pair, a fourth variant of a treatment roll path with five rolls and a reversing device arranged above the former, at a lower built height, in particular, as a configuration for an MDO unit.
Figure 5:
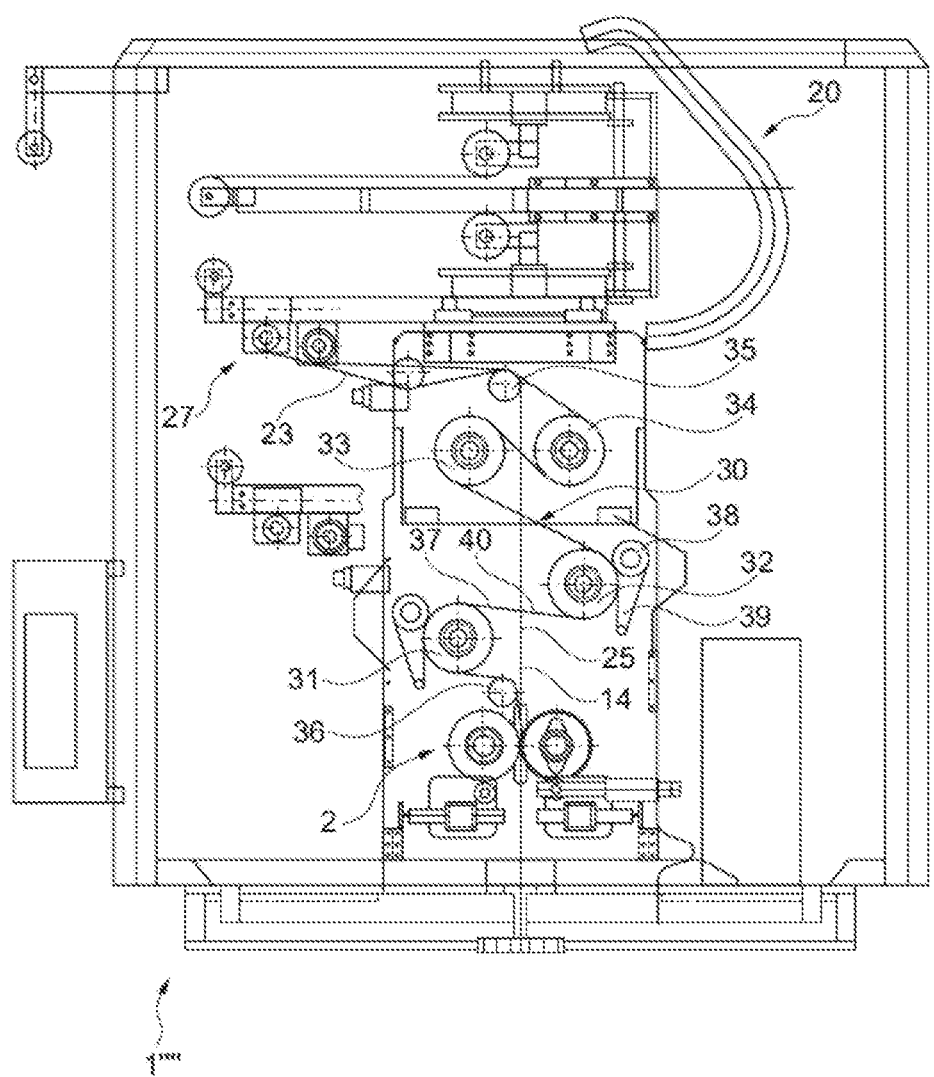
FIG. 5 shows, schematically as a vertical section through a takeoff roll pair, a fifth variant of a treatment roll path with four rolls and a reversing device arranged above the former, in particular, as a configuration for a layflat package.

The fourth embodiment of blown film line 1''' in FIG. 4 is embodied identically to the variants described above up to a takeoff roll pair 2'''.

The first takeoff roll 3''' located on the same side 16 as the infeed for reversing unit 20 is, however, embodied to be slideable for threading and for closing takeoff roll pair 2''' in the fourth variant of blown film web line 1". However, a second takeoff roll 5''' located on an opposite side 17 of virtual plane 14, is embodied to be fixed in principle.

Above takeoff roll pair 2''', four rolls of a treatment roll path 8''' lie arranged horizontally next to each other, and offset from these to the side and in height, a fifth roll 13'''.

Thus, with regard to virtual plane 14 above the takeoff roll pair 2''', three rolls of treatment roll path 8" are located on the second, here right-hand, side 17 while two rolls of treatment roll path 8" are located on the first, here left-hand, side of virtual plane 14; i.e., on the same side as the infeed for reversing unit 20.

For this purpose, a machine rack 21''' for the rolls of treatment roll path 8''' has a cantilever 24, which protrudes laterally from a main body of machine rack 21". The cantilever 24 supports first roll 9'''.

Due to the horizontal arrangement next to each other of several rolls of treatment roll path 8'''— i.e., here a total of four rolls of treatment roll path 8", blown film line 1''' overall has a very low form factor, despite the fact that the reversing unit 20 is arranged above takeoff roll pair 2''' and treatment roll path 8'''.

Two of the rolls within treatment roll path 8''', here second roll 10''' and fourth roll 12", are again embodied to be combingly slideable, thus making threading into the line easier at start-up. Especially under tight space conditions, however, pivoting can also be provided for; e.g., second roll 10" can also be embodied to be pivotable around first roll 9'''; at the same time fourth roll 12''' e.g. can be embodied to be pivotable around fifth roll 13''' or around third roll 11'''.

Extending straight above takeoff roll pair 2''', i.e., in virtual plane 14, a straight path 25 for double-layer film web 23 is left open so that double-layer film web 23 can also be produced without running through MDO treatment roll path 8". Then the film web runs straight up to a straight-line path reversing roll 26, and from there further into infeed 27 of reversing unit 20.

Alternatively, double-layer film web 23 can be routed along an MDO path 28 that pivots directly onto the opposite side 17 of virtual plane 14—relative to infeed 27—and runs around the outside of first roll 9'''. Then follows the passage already described above through the additional four rolls, which also have the same functions as already described above.

From fifth roll 13''', the double-layer film web 23 finally runs either over another reversing roll 29 or, if the arc of contact of fifth roll 13''' is already sufficient, directly to infeed 27 of reversing unit 20.

Fifth roll 13''', which serves as a chill roll, and/or an additional reversing roll 29 provided, such as additional cooling units, can be adjustable together or towards each other, and namely individually or together, so that the cooling path is easily adjustable. E.g., fifth roll 13''' and the additional reversing roll 29 can be supported together on the machine rack, which rotates about an axis that lies in parallel with the shown rolls; or, e.g., the additional reversing roll 29 can be movable vertically downward or pivotable so that, by means of quite simple movements, the arc of contact of double-layer film web 23 on the MDO path 28 around fifth roll 13''' can be set and practically variably dosed. Even with a predetermined cooling temperature it is then possible to set the cooling effect before the double-layer film web 23 enters reversing unit 20.

A similar idea can, e.g., be performed with first roll 9''', which ideally serves as a holding roll and simultaneously, as a heating roll. This roll can also be adjusted, e.g., in height or laterally so that the changed geometry of the MDO path of the double-layer film web 23 results in a changed arc of contact around first roll 9''', and in a change in stretch length.

A like effect can also be achieved with another contact roll that is provided there.

In the fifth variant of blown film line 1"" a layflat path 30 is again located above takeoff roll pair 2, and above, a reversing unit 20 with an infeed 27.

Within layflat path 30, a first roll 31, a second roll 31, a third roll 33, and a fourth roll 34 are provided. From there, a designated film path via a number of passive reversing rolls 35 (the first one shown as an example) to infeed 27 into reversing unit 20 is provided.

The four rolls of layflat path 30 are again provided with lateral clearance from virtual plane 14, resulting in a straight path 25 for the double-layer film web 23 from takeoff roll pair 2 directly to the first passive reversing roll 35, and from there further to reversing unit 20 if the double-layer film web 23 is not supposed to run through the layflat system.

As an alternative, the double-layer film web 23 can be routed—here, e.g., around a first reversing unit 36—to first roll 31, from there around roll 32, from there around third roll 33, and finally around fourth roll 34, until double-layer film web 23 rejoins straight path 25 on this layflat path 37.

Two each of the total of four rolls of layflat path 30 are essentially at the same height; they each form a pair with a low form factor. When projected to virtual plane 14, an overlap area results between first roll 31 and second roll 32, and even congruence between third roll 33 and fourth roll 34.

But a small amount of overlap is already sufficient for achieving a lower form factor as compared to the design shown in FIGS. 2 and 3.

All four rolls of layflat path 30 ideally have a contact roll 38 (shown as an example) that will be jointedly pressed into the respective roll by means of a contact arm 39 (shown as an example).

In the present exemplary embodiment, only two of the rolls have been provided with contact rolls, namely first roll 31, which serves as holding roll and heating roll, and second roll 32, which serves as transversely stretching roll and annealing roll.

This results in a transversely stretching section 40 between first roll 31 and second roll 32, and high tangential forces will result on the circumferences of first roll 31 and second roll 32.

Third roll 33 and fourth roll 34, instead, are designed to be chill rolls, [with] the surface speeds set in coordination with the surface speed of second roll 32 in such a manner that no more transverse stretching occurs there, or even slower, so that relaxation can occur.

The described embodiment is envisioned as a layflat unit; i.e., usually with a max. stretch of 1:1.05. The stretching length is quite long compared to the MDO variants.

The longer dwell time in the stretching section resulting from this is advantageous for a wide process window.

As only small little stretching is performed, small drive outputs are sufficient. Individual drives are unnecessary as the film works minimally. It is thus completely sufficient if the holding roll and second roll 32 each are driven, and their speed is adjustable.

As only a low temperature, and thus energy, level must be reached, according to the inventors' prototype tests, a water heating system is completely sufficient.

In the implementation of the layflat unit, the second roll preferably has the same temperature as the first roll. The first roll is used as a heating and holding roll. The second roll is used as a stretching and annealing roll. The section between the second and the subsequent third roll is then an annealing section.

In an MDO embodiment, however, stretching of 1:10 or even more is possible without problems.

The transverse stretching length should be as short as possible in order to reduce transverse contraction, the so-called neck-in.

Process management is clearly more critical because the dwell time in the very short stretch gap is very short.

As more rolls must be temperature-conditioned, there is higher energy expense, and an overall rather long temperature-conditioning path is necessary.

The drives must be quite strong in order to overcome the plastic's yield point and to slightly exceed the flow range.

Individual drives are suggested in order to allow individualized process management.

For simple layflat improvement, an MDO design is actually too big and thus normally, uneconomical.

As MDO requires high temperatures, it is normally proposed that oil heating be used.

Figure 6:
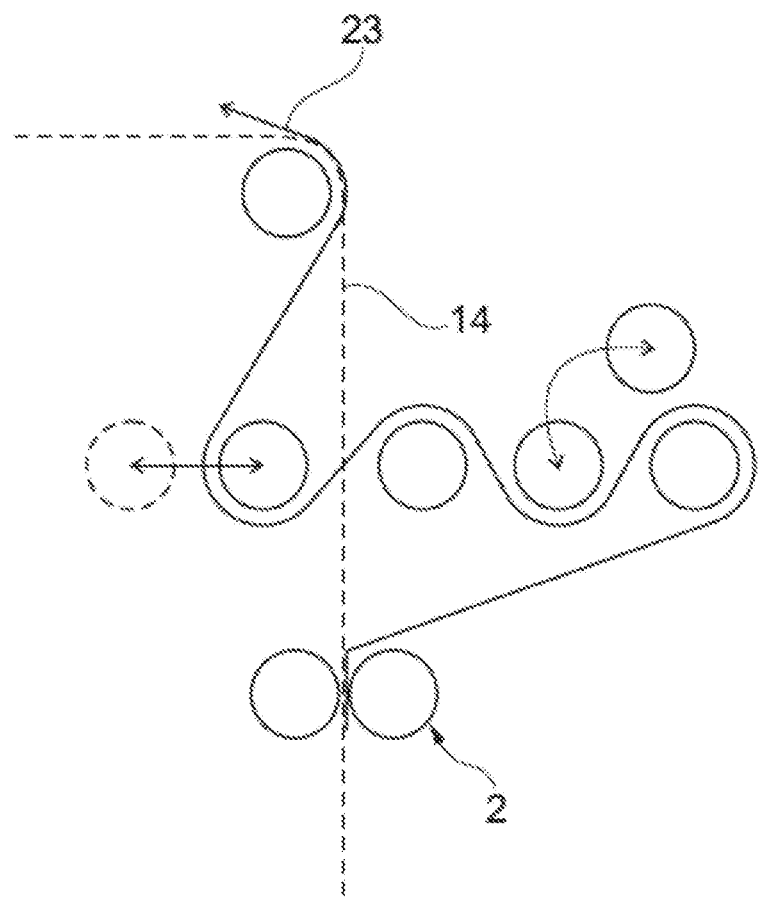
FIG. 6 shows, highly schematically, a possible sixth variant for a treatment roll path with the least possible built height.

In the fifth embodiment variant in FIG. 6, there is also a processing section provided for that lies transversely above the takeoff roll pair; actually a horizontally lying one for four rolls, with a chill roll being arranged further up, and that would allow, above the takeoff roll pair, straight pass-through of the double-layer film web.

Within the horizontally lying roll section, again, two rolls are movable; namely, a second roll pivotable about the first roll, and a fourth roll arranged slideably or pivotably on the other side of virtual plane 14.

Besides, the fifth variant in FIG. 6 can be used just like the variants described above in a blown film line.

Figure 7:
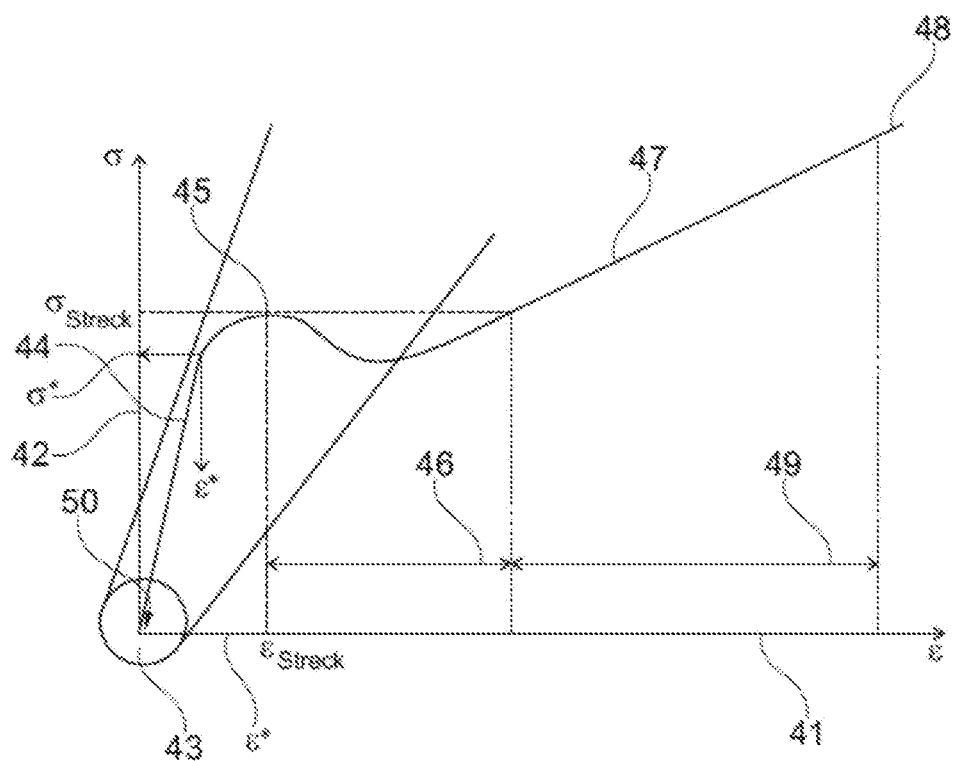
FIG. 7 shows a diagram on the development of longitudinal tensile stress σ over an elongation c of a plastic film.

The diagram in FIG. 7 has a basic graphical description of the behavior of the films to be processed here.

There, on an X-axis 41, the longitudinal stretching c of the film is entered, while on the Y-axis 42, the longitudinal tension within the film is shown; i.e., a parameter that is proportionate to the longitudinal tensile force within the film. Longitudinal tension is named $\sigma$.

Starting from Zero 43, the film usually behaves in a linear tension increase field 44 as longitudinal stretching c increases. From a certain longitudinal stretching $\varepsilon^*$ or the concomitant tension $\sigma^*$, the film leaves the range of linear tension increase, and the tension curve becomes flatter; i.e., it has s smaller increase compared to X-axis 41.

Starting from longitudinal stretching $\varepsilon^*$, longitudinal stretching applied is irreversible.

Tension $\sigma$ then assumes a first maximum 45. At this point, so-called plastic flow of the film starts. The corresponding longitudinal stretching $\varepsilon^{Streck}$ is called yield limit. A flow range 46 extends from first maximum 45 of longitudinal tension $\sigma$, called $\sigma_{Streck}$, up to the area the branch 47 that rises again, where longitudinal tension $\sigma$ again reaches tension $\sigma_{Streck}$.

From there, longitudinal tension $\sigma$ steadily increases with increasing longitudinal stretching $\varepsilon$ until there is a sudden failure in the shape of film rupture 48.

From the regaining of tension $\sigma_{Streck}$ to the film rupture extends an MDO working range 49.

In contrast, a layflat unit working range lies in the area beyond the linear tension increase field 44, but below yield limit $\varepsilon^{Streck}$. Within the linear tension increase field 44, i.e., up to longitudinal extension in machine direction $\varepsilon^*$, the film's behavior is elastic.

Simply put, the extension in machine direction of a layflat package thus takes place between $\varepsilon^*$ and the local maximum. In contrast, the strong stretching in machine direction of an MDO takes place from regaining of $\sigma^{Streck}$.

Figure 8:
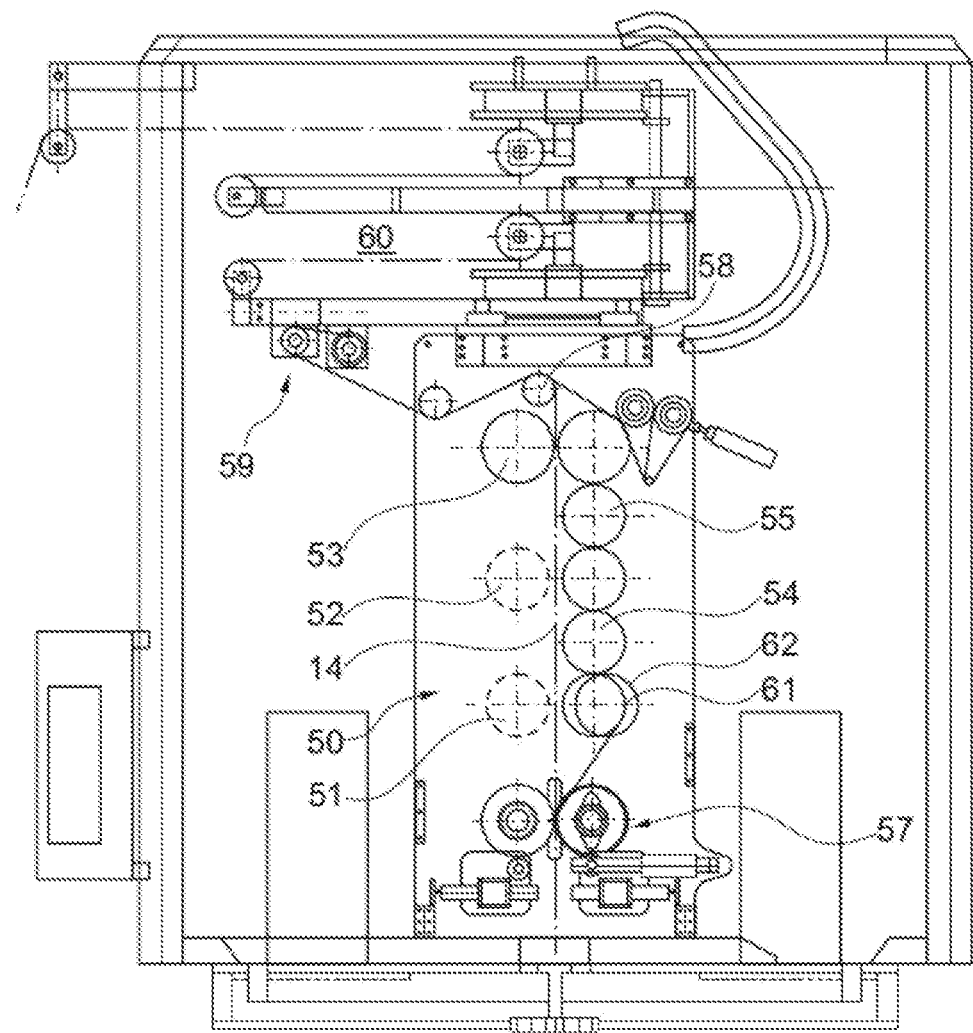
FIG. 8 shows, schematically as a vertical section through a takeoff roll pair, a sixth variant of a treatment roll path with five rolls and a reversing device arranged above the former.

In terms of its construction with five rolls, treatment roll path 50 in FIG. 8 corresponds in principle to the second variant from FIG. 2 and the third variant from FIG. 3; has, however, with its first roll 51, its third roll 52, and its fifth roll 53 three combing rolls, while its second roll 54 and its fourth roll 55 are designed to be stationarily rotating.

For threading the double-layer film web at the start of the blowing process, the three combing rolls; i.e., first roll 52, third roll 52 and fifth roll 53, are moved out of their combed-in position; i.e., in FIG. 8 to the left of virtual plane 14, so that double-layer film web can simply be guided from nip 56 of takeoff roll pair 57 vertically upwards to reversing roll 58. Reversing roll 58 is the first roll that lies beyond treatment roll path 50. From reversing roll 58, the double-layer film web is routed transversely to infeed 59 into a reversing unit 60.

During combing-in, first roll 51 cannot only be moved into the plane of the stationary rolls; i.e., second roll 54 and fourth roll 55 (shown in FIG. 8 by means of a first contour

61 of combed-in first roll 51); instead, first roll 51 can even be moved through this plane while combing through, so that the center axis of first roll 51 moves beyond the plane formed by the center axes of second roll 54 and fourth roll 55. Thus, first roll 51 can assume a combed-through position for blowing operation (shown in FIG. 8 by means of a second contour 62 of first roll 51).

Prototype tests have shown that a preferably variable adjustability of the combing-in depth; i.e., in particular with a comb-through depth through the plane of the stationary rolls, can be advantageous for process reliability and the resulting film quality.

Figure 9:
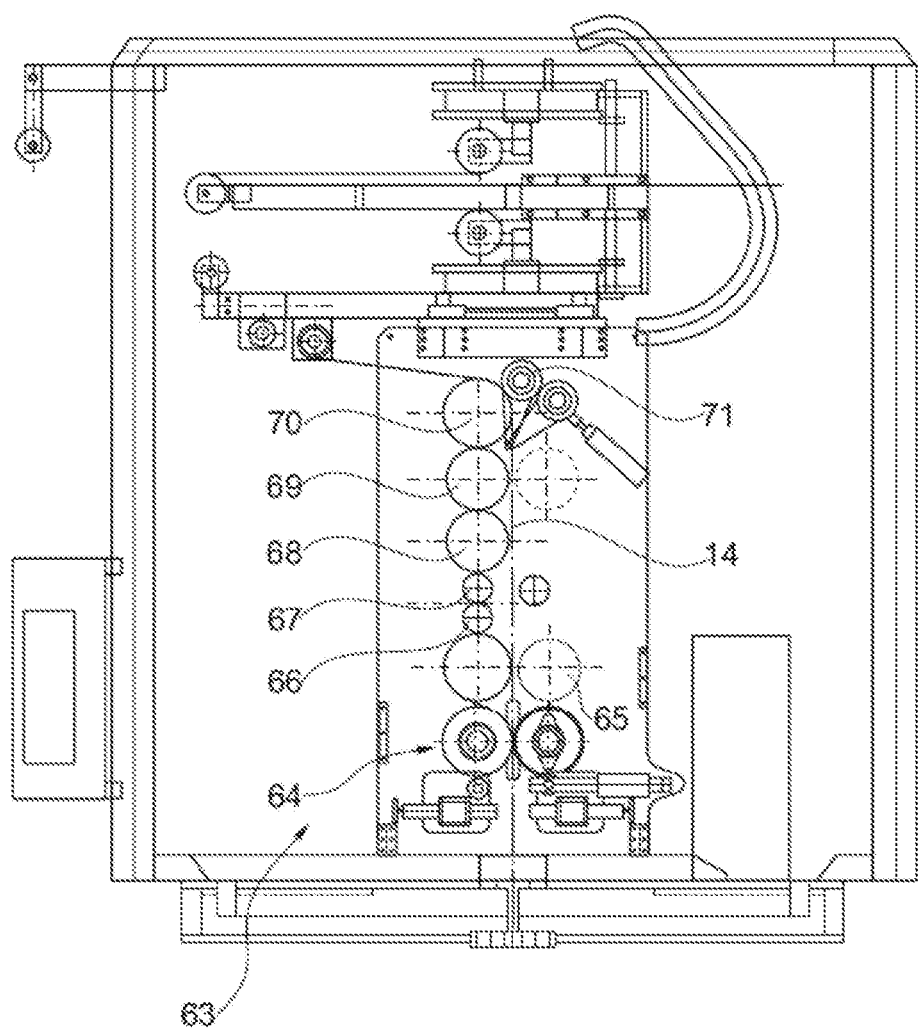
FIG. 9 shows, schematically as a vertical section through a takeoff roll pair, a seventh variant of a treatment roll path with six rolls for four treatment stations and with a reversing device arranged above the former.

Treatment roll path 63 according to the seventh variant in FIG. 9 shows a somewhat different construction:

Above nip roll pairs 64 there is treatment roll path 63 in vertical orientation.

A first roll 65 is designed as a heating roll and simultaneously, as a holding roll. It is movable combingly through virtual plane 14. Combing has already been described above several times. Its advantages and also the option of combing through the plane of stationary rolls shall be assumed to be known now.

A second roll 66 has been provided with a clearly smaller diameter than first roll 65.

Third roll 67 has also been provided with a clearly smaller diameter than first roll 65, preferably as designed here with the same diameter as second roll 66.

Second roll 66 and third roll 67 form a stretching station in which third roll 67 is embodied as combing. Due to the variable adjustability of at least one of the two rolls 66, 67 of the stretching station, the stretching length can be variably adjusted, which has been shown in prototype tests to be very advantageous.

Second roll 66, which constitutes simultaneously a first roll of the stretching station, will preferably be driven at the same circumferential speed as first roll 65; i.e., the big holding roll. With regard to the function of the holding station, second roll 66 would be considered part of the holding station rather than of the stretching station; and namely together with first roll 65. Only with regard to its diameter is it also possible to consider second roll 66 together with third roll 67 as part of the stretching station.

The two small rolls, i.e., second roll 66 and third roll 67, are not heated, but they are driven. This allows designing second roll 66 and third roll 67 to have very small diameters.

However, third roll 67 is driven at a higher circumferential speed than second roll 66. Thus, a stretching section for the double-layer film web forms between second roll 66 and third roll 67.

If it is assumed that at the existing geometric ratios, adhesive friction exists for about 70° of the circumference of the faster-driven third roll 67, the stretching length of the stretching section for large roll diameters is between about 250 mm and 290 mm, and for small roll diameters between about 100 mm and 140 mm; about 15 cm to 19 cm, actually in a prototype test about 17 cm.

The faster-driven third roll 67 is followed in treatment roll path 63 by a first annealing roll 68 and a second annealing roll 69, whereby the latter can also be combingly brought into its operating position.

The two annealing rolls 68, 69 are followed by a chill roll 70—whose diameter was slightly increased in the present example. Chill roll 70 has a contact roll 71.

Chill roll 70 together with its contact roll 71 forms the last station of treatment roll path 63. From there, the double-layer film web is routed to the infeed for the reversing unit.

The rolls of treatment roll path 63 are arranged quite tightly together, with a clearance in vertical arrangement of only about 10 mm to 30 mm in order to achieve the lowest possible form factor.

Preferably, several or even all roll surfaces of treatment roll path 63 have a rough, grippy surface, ideally with embedded silicone.

DE 10 2009 033 171 A1 describes the control process as follows, whereby the statements below are to be an integral part of the total disclosure content of the present patent application.

Figure 10:
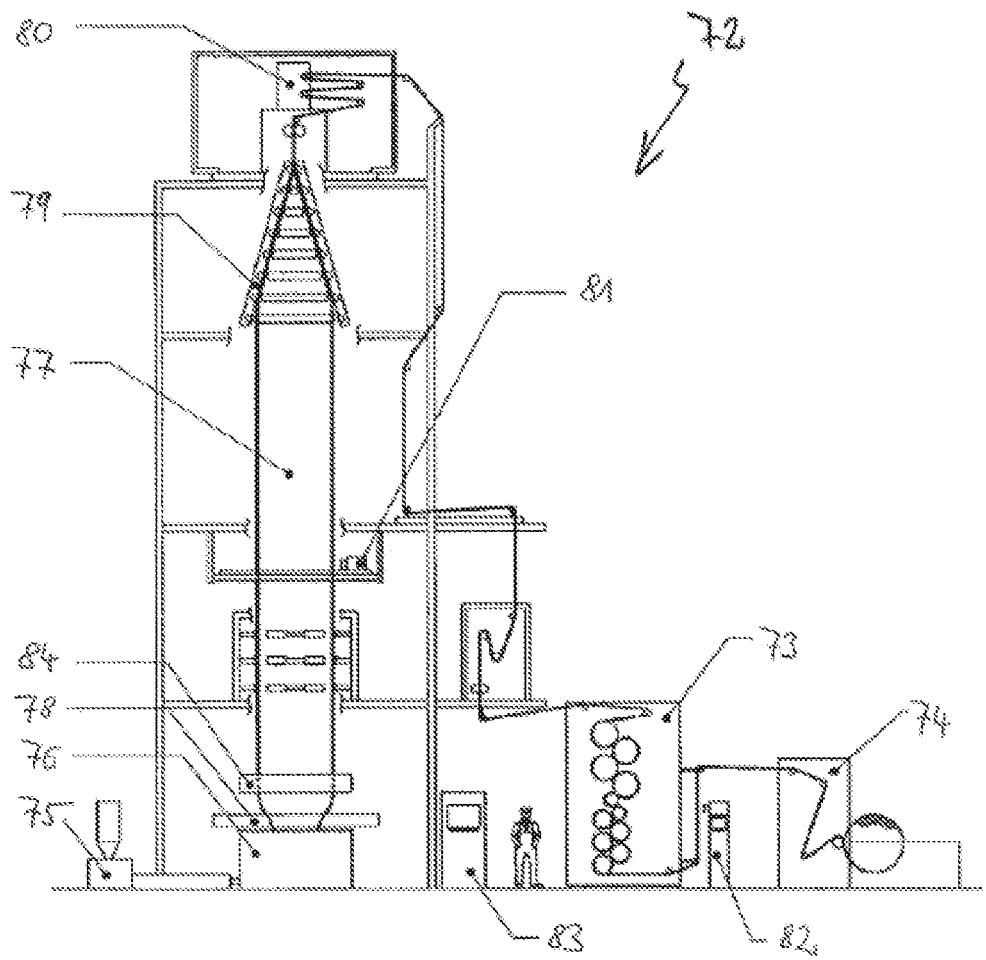
FIG. 10 shows, highly schematically, a blown film line from prior art, also like FIGS. 11 through 13 from EP 2 277 681 A1, with a downstream stretching device, in which the process located there for controlling the film gauge is applied.

FIG. 10 shows a blown film line 72 with a downstream stretching unit 73 and winder 74. Via a dosing device, the plastic granules to be processed are fed to an extruder 75, in which they are melted, homogenized and fed to die head 76. If multi-layer films are produced, several extruders will be used according to the number of layers. Die head 76 has an annular nozzle from which the extruded plastic mass exits. Cooling air is routed through die head 76 for inflating tube film 77. Once the plastic is frozen, tube film 77 will be laid flat in layflat unit 79 and continuously taken off and laid down with reversing takeoff 80. Then the blocked film is monoaxially stretch in the machine direction in stretching system 73. The film is routed to winder 74 and wound on film rolls.

Controlling the film gauge profile requires detecting the actual film profile, preferably in two locations. The actual gauge profile at the circumference of tube films 77 is detected at measuring device 81 between segmented control unit 78 and reversing takeoff 80, and the actual gauge profile of the stretched film over its width is detected at measuring device 82 between stretching system 73 and winder 74. Measuring device 81 for measuring the actual gauge profile of tube film 77 is preferably arranged at a constant height above die head 76, rotating around the tube film.

The entire film blowing process is controlled by line controller 83, in particular the drives, cooling air, segmented control zone 78, which is located in the cooling ring, in die head 76, or downstream, as well as the takeoff speed of the tube film.

The actual film profiles measured by measuring devices 81 and 82 are routed to line controller 83 and forwarded to segmented control zone 78 by means of target/actuals comparison signals.

Figure 11:
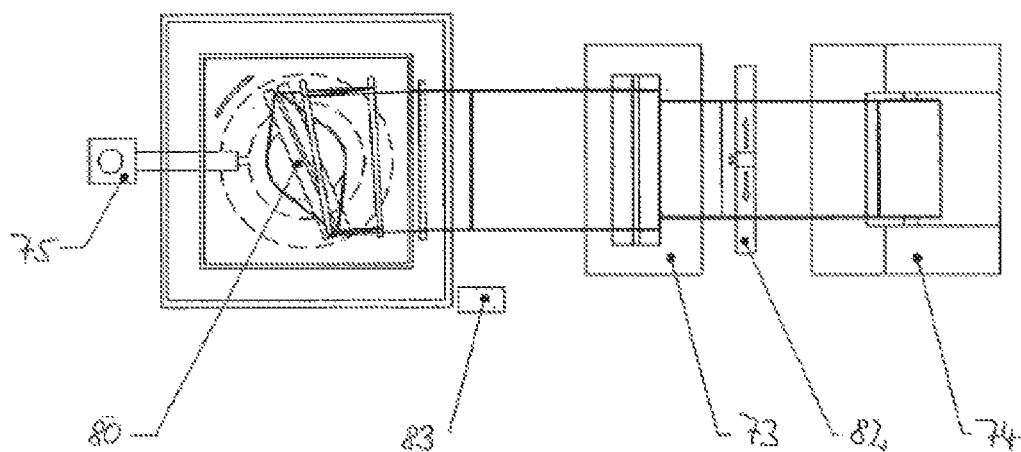
FIG. 11 shows a top view of the blown film line from FIG. 10.

In FIG. 11, the line is shown in a top view. It is clearly shown that reversing takeoff 80 performs a reversing movement between 0° and 180° in all directions (see double arrow) and that thus, tube film 77 is not always laid together at the same edges. If the controller did not take this offset into account, the thin spots that have been imprinted into the gauge profile of tube film 77 during the blowing process, would run back and forth across one area of the width of the laid-flat film and would not represent the film edges.

Figure 12:
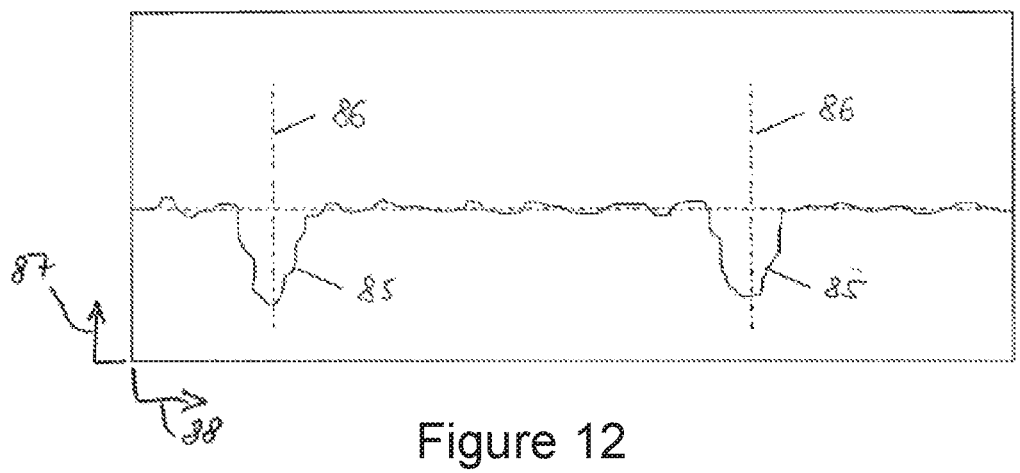
FIG. 12 shows an exemplary actual gauge profile of a film tube with two thin spots.

FIG. 12 shows the actual gauge profile of a film tube with two thin spots 85. Such a gauge profile is, e.g., detected by film gauge measuring device 81 between segmented control zone 78 and layflat device 79 in a balanced control state. The two dashed lines 86 indicate the folding edges formed by the two lateral edges of the laid-flat film. The two thin spots 85 form the two marginal areas when the film is routed to stretching device 73 as a blocked tube.

In another implementation case of this disclosure that has already been described, the blown and laid-flat film tube is slit open at these two positions 86, and then the two flat film webs are each fed to a separate stretching device 73. Here too, the two thinner spots; i.e., one half each of the thin spots

85 shown in FIG. 12, form the marginal areas of the film routed to stretching device 73.

Figure 13:
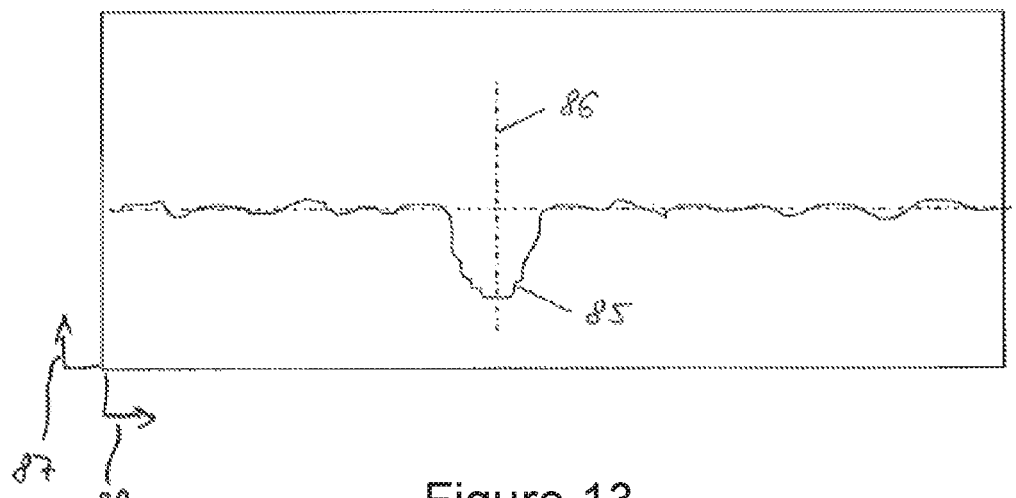
FIG. 13 shows an exemplary actual gauge profile of a film tube with one thin spot.

FIG. 13 shows the actual gauge profile of the film tube with only one thin spot 85, as it is used in a third implementation of the disclosure. The film tube is only slit open in one location 86 in the area of thin spot 85. The slit tube is then folded open as a flat web and routed to stretching device 73. Here too, half each of the thin spot 85 can be found again as the marginal area of the film routed to the stretching device.

The invention claimed is:

1. Method for manufacturing a blown film web on a blown film line with the steps:
   a. Extruding a film tube;
   b. Inflating the film tube in a tube forming zone and taking off a double-layer film web formed from the film tube with a takeoff roll pair for drawing the film tube longitudinally and transversely;
   c. Cooling the rising film tube using a means of cooling;
   d. Laying flat the film tube into the double-layer film web;
   e. Routing double-layer film web further upwards above takeoff roll pair and through a treatment roll path—with disposed above the takeoff roll pair, the treatment roll path having a means of heating for heating double-layer film web;
   f. Treating double-layer film web on treatment roll path; namely stretching double-layer film web in a stretching path of treatment roll path;
   g. Routing double-layer film web through a reversing unit disposed above the treatment roll path for laying; wherein the additional step of
   h. Controlling the film gauge of the double-layer film web stretched monoaxially in the machine direction by means of a predetermined target gauge profile, whereby the film gauge profile of the tube film produced on blown film line is controlled in such a manner that the predetermined target gauge profile has variances from a uniform film gauge that are used to compensate for the change in film gauge over the film width resulting from the subsequent monoaxial stretching in the machine direction so that, by means of stretching, a film with a transverse gauge profile having the least possible variances from the mean film gauge over the entire film width is produced; whereby for threading double-layer film web upon startup of blown-film line, a roll of treatment roll path is slid or pivoted from its operating position, and double-layer film web is tensioned after threading.

2. Method according to claim 1, wherein in treatment step f, double-layer film web in addition to being stretched, is embossed, irradiated, and/or subjected to corona treatment.

3. Method according to claim 1, wherein the extruded tube film is controlled to a predetermined target gauge profile via its circumference.

4. Method according to claim 1, wherein the target profile laying resulting from the reversing takeoff is compensated over the film width and continuously adjusted, whereby the assignment of one or several circumferential points and/or sectors of the laid-flat tube film to one or several control zones in the control algorithm is taken into account for controlling the segmented control zone.

5. Method according to claim 1, wherein the predetermined target gauge profile is controlled by means of an algorithm from the readings of a measuring device that measures the film gauge across the entire film width after monoaxial stretching in the machine direction.

6. Method according to claim 1, wherein the control algorithm for controlling the individual segmented control zones includes a superimposition
   of the base profile from the film gauge profile control of the blown-film line;
   of the stretching profile from the laying of the tube film by means of the reversing takeoff and impacts from the stretching process;
   and optionally, of the roll profile from the evaluation of the film roll.

7. Method according to claim 1, wherein the target gauge profile is set manually in the control system.

8. Method according to claim 1, wherein the film is routed to the stretching device in the treatment roll path blocked.

9. Method according to claim 1, wherein the tube film is slit open on one or both side(s), folded open, and routed to the stretching device.

10. Method according to claim 1, wherein for the purpose of controlling, the film gauge is measured above takeoff roll pair according to the routing of the film web proposed here.

* * * * *